(12) United States Patent
Martz et al.

(10) Patent No.: US 10,454,997 B2
(45) Date of Patent: Oct. 22, 2019

(54) DISTRIBUTED PHYSICAL SECURITY SYSTEM

(75) Inventors: Andrew Martz, Vancouver (CA); Ross Wightman, Vancouver (CA); Greg Magolan, North Vancouver (CA); Shaun Marlatt, Vancouver (CA)

(73) Assignee: Avigilon Corporation, Vancouver (CA)

( * ) Notice: Subject to any disclaimer, the term of this patent is extended or adjusted under 35 U.S.C. 154(b) by 482 days.

(21) Appl. No.: 13/607,447

(22) Filed: Sep. 7, 2012

(65) Prior Publication Data

US 2014/0074987 A1 Mar. 13, 2014

(51) Int. Cl.
| | |
|---|---|
| *H04L 29/08* | (2006.01) |
| *H04L 29/10* | (2006.01) |
| *G06F 21/62* | (2013.01) |
| *H04L 12/28* | (2006.01) |
| *G08B 13/196* | (2006.01) |

(52) U.S. Cl.
CPC .......... *H04L 67/10* (2013.01); *G06F 21/6272* (2013.01); *H04L 12/2825* (2013.01); *G08B 13/19697* (2013.01)

(58) Field of Classification Search
CPC ........................................................ G06F 15/16
USPC ........................................................ 709/219
See application file for complete search history.

(56) References Cited

U.S. PATENT DOCUMENTS

| | | | |
|---|---|---|---|
| 5,999,712 A | 12/1999 | Moiin et al. | |
| 7,185,076 B1 | 2/2007 | Novaes et al. | |
| 8,121,148 B2 | 2/2012 | Olderissen | |
| 8,601,112 B1* | 12/2013 | Nordstrom | G06Q 10/0631 707/600 |
| 8,675,672 B1* | 3/2014 | Bao et al. | 370/408 |
| 2004/0221149 A1 | 11/2004 | Rao et al. | |
| 2005/0091396 A1* | 4/2005 | Nilakantan | H04L 45/04 709/232 |
| 2006/0015599 A1* | 1/2006 | Li et al. | 709/223 |

(Continued)

FOREIGN PATENT DOCUMENTS

| | | | |
|---|---|---|---|
| CN | 101873237 A | 10/2010 | |
| CN | 102025550 A | 4/2011 | |

(Continued)

OTHER PUBLICATIONS

Almeida, et al. "Interval tree clocks: a logical clock for dynamic systems" *Principles of Distributed Systems*, Springer Berlin Heidelberg, pp. 259-274, 2008.

(Continued)

*Primary Examiner* — Kevin T Bates
*Assistant Examiner* — Mark A Scott
(74) *Attorney, Agent, or Firm* — Daniel Hammond

(57) ABSTRACT

The present disclosure is directed at methods, systems, and techniques for sharing data in a physical security system that includes multiple server nodes. One of the server nodes (a "first node") accesses a node identifier identifying another of the server nodes (a "second node"), following which the first node sends the data to the second node. Both the first and second nodes are part of a server cluster that includes multiple server nodes, and each of the server nodes in the server cluster has access to cluster membership information. The cluster membership information identifies all of the server nodes in the server cluster, and the node identifier is part of the cluster membership information.

54 Claims, 9 Drawing Sheets

(56) References Cited

U.S. PATENT DOCUMENTS

| | | | |
|---|---|---|---|
| 2008/0084473 A1* | 4/2008 | Romanowich | G08B 13/19671 348/135 |
| 2008/0104218 A1 | 5/2008 | Liang et al. | |
| 2008/0270569 A1* | 10/2008 | McBride et al. | 709/217 |
| 2009/0080443 A1* | 3/2009 | Dziadosz | H04L 67/1095 370/401 |
| 2009/0182610 A1* | 7/2009 | Palanisamy | G06Q 10/06 707/600 |
| 2009/0327817 A1 | 12/2009 | Iyemgar et al. | |
| 2010/0124271 A1 | 5/2010 | Martz et al. | |
| 2010/0312879 A1* | 12/2010 | Taieb | G06F 8/20 709/224 |
| 2011/0026513 A1* | 2/2011 | Tien | G06F 16/27 370/350 |
| 2011/0141280 A1* | 6/2011 | Cao | H04N 21/643 348/143 |
| 2011/0231524 A1* | 9/2011 | Lin | G06F 3/0635 709/220 |
| 2012/0079092 A1* | 3/2012 | Woxblom | H04L 47/20 709/223 |
| 2012/0158894 A1* | 6/2012 | Desgagne | H04N 21/6125 709/217 |
| 2012/0259912 A1* | 10/2012 | Kruse | G06F 17/3012 709/203 |
| 2012/0278422 A1* | 11/2012 | Oliver | G06F 9/4843 709/212 |
| 2012/0303737 A1* | 11/2012 | Kazar | G06F 12/0815 709/213 |
| 2012/0314127 A1* | 12/2012 | Syed | H04N 7/181 348/384.1 |
| 2012/0317274 A1* | 12/2012 | Richter et al. | 709/224 |
| 2013/0024901 A1* | 1/2013 | Sharif-Ahmadi | H04L 41/12 725/114 |
| 2013/0073717 A1* | 3/2013 | Collin | G06F 3/0613 709/224 |
| 2013/0113928 A1* | 5/2013 | Feldman | H04N 7/183 348/143 |
| 2013/0185408 A1* | 7/2013 | Ngo | H04L 41/046 709/223 |
| 2013/0307971 A1* | 11/2013 | Ganesan et al. | 348/143 |
| 2013/0307989 A1* | 11/2013 | Stone | H04N 7/181 348/159 |
| 2013/0329050 A1* | 12/2013 | Pham et al. | 348/159 |
| 2014/0025770 A1* | 1/2014 | Warfield | G06F 15/17331 709/213 |

FOREIGN PATENT DOCUMENTS

| | | |
|---|---|---|
| GB | 2368683 A | 5/2002 |
| JP | 2002-041488 | 2/2002 |
| WO | WO 99/021098 | 4/1999 |

OTHER PUBLICATIONS

Amir, et al. "Efficient State Transfer in Partitionable Environments," *Institute of Computer Science, The Hebrew University*, 1997.

Amir, et al. "The Totem Single-Ring Ordering and Membership Protocol," *ACM Transactions on Computer Systems*, vol. 13, No. 4, pp. 311-342, 1995.

Berners-Lee, et al. "Uniform Resource Identifier (URI): Generic Syntax," The Internet Society (2005) as available at: http://tools.ietf.org/html/rfc3986, on Sep. 2, 2012.

Berners-Lee, et al. "Uniform Resource Identifier (URI): Generic Syntax," The Internet Society (2005) as available at: http://tools.ietf.org/html/rfc3986, on Dec. 16, 2013.

Birman. "Chapter 6: A history of the virtual synchrony replication model." *Replication*. Springer Berlin Heidelberg, pp. 91-120, 2010.

DeCandia, et al. "Dynamo: amazon's highly available key-value store." ACM SIGOPS Operating Systems Review. vol. 41. No. 6. ACM, 2007.

Google Developers. "Protocol Buffers," as available at: https://developers.google.com/protocol-buffers/docs/encoding, on Jun. 2, 2012.

Google Developers. "Protocol Buffers," as available at: https://developers.google.com/protocol-buffers/docs/encoding, on Dec. 16, 2013.

Leach, et al. "A Universally Unique Identifier (UUID) URN Namespace," The Internet Society (2005), as available at: http://tools.ietf.org/html/rfc4122, on Sep. 4, 2012.

Leach, et al. "A Universally Unique Identifier (UUID) URN Namespace," The Internet Society (2005), as available at: http://tools.ietf.org/html/rfc4122, on Dec. 16, 2013.

Moser, et al. "Extended Virtual Synchrony." *Distributed Computing Systems, 1994, Proceedings of the 14th International Conference on*. IEEE, 1994.

OASIS Web Services Dynamic Discovery (WS-Discovery) Version 1.1, OASIS Standard, as available at: http://docs.oasis-open.org/ws-dd/discovery/1.1/os/wsdd-discovery-1.1-spec-os.pdf, on Jul. 1, 2009.

"Project Voldemort—A distributed database," as available at: http://www.project-voldemort.com/, on Dec. 16, 2013.

"Project Voldemort—A distributed database," as available at: http://www.project-voldemort.com/, on Sep. 2, 2012.

"Riak" as available at: http://www.basho.com/Riak.html, on Dec. 16, 2013.

Van Renesse, et al. "A Gossip-Style Failure Detection Service," *IFIP International Conference on Distributed Systems Platforms and Open Distributed Processing*, pp. 55-70, 1998.

Van Renesse, et al. "Efficient Reconciliation and Flow Control for Anti-Entropy Protocols." *Proceedings of the 2nd Workshop on Large-Scale Distributed Systems and Middleware*. ACM, 2008.

Wikipedia. "Galois/Counter Mode," as available at: http://en.wikipedia.org/wiki/Galois/Counter_Mode, on Aug. 17, 2012.

Wikipedia. "Galois/Counter Mode," as available at: http://en.wikipedia.org/wiki/Galois/Counter_Mode, on Dec. 16, 2013.

Wikipedia. "Gossip Protocol," as available at: http://en.wikipedia.org/wiki/Gossip_protocol, on Jul. 16, 2012.

Wikipedia. "Gossip Protocol," as available at: http://en.wikipedia.org/wiki/Gossip_protocol, on Dec. 16, 2013.

Wikipedia. "Maximum Transmission Unit," as available at: http://en.wikipedia.org/wiki/Maximum_transmission_unit, on Dec. 16, 2013.

Wikipedia. "Maximum Transmission Unit," as available at: http://en.wikipedia.org/wiki/Maximum_transmission_unit, on Aug. 27, 2012.

Wikipedia. "Virtual Synchrony," available as at: http://en.wikipedia.org/wiki/Virtual_synchrony, on accessed Dec. 16, 2013.

Wikipedia. "Virtual Synchrony," available as at: http://en.wikipedia.org/wiki/Virtual_synchrony, on accessed Jun. 15, 2012.

Wikipedia. "WS-Discovery," as available at: http://en.wikipedia.org/wiki/WS-Discovery, on Apr. 5, 2012.

Wikipedia. "WS-Discovery," as available at: http://en.wikipedia.org/wiki/WS-Discovery, on Dec. 16, 2013.

Zhou, et al. "An Efficient Topology-Adaptive Membership Protocol for Large-Scale Cluster-Based Services," *Parallel and Distributed Processing Symposium, 2005. Proceedings, 19th IEEE International*. IEEE, 2005.

The Apache Software Foundation, "Cassandra," (2009) as available at: http://cassandra.apache.org/, on Sep. 5, 2012.

The Apache Software Foundation, "Cassandra," (2009) as available at: http://cassandra.apache.org/, on Dec. 16, 2013.

International Search Report and Written Opinion for Application No. PCT/CA2013/050690, dated by the Canadian Intellectual Property Office as ISA on Dec. 12, 2013 (11 pages).

Examination Report dated Oct. 6, 2016, issued by the New Zealand Intellectual Property Office in New Zealand Patent Application No. 705517; 7 pages.

European Search Report for Application No. 13835467.5, dated by the European Patent Office on Jun. 28, 2016 (6 pages).

Patent Examination Report dated Nov. 18, 2016, issued by the Australian Intellectual Property Office in Australian Patent Application No. 2013312982; 4 pages.

First Examination Report dated Oct. 6, 2016, issued by the New Zealand Intellectual Property Office in New Zealand Application No. 705517, 7 pages.

(56) References Cited

OTHER PUBLICATIONS

Official Office action dated Oct. 23, 2017, issued by the Japanese Patent Office in Japanese Application Serial No. 2015-530252.
English translation of official Office action dated Oct. 23, 2017, issued by the Japanese Patent Office in Japanese Application Serial No. 2015-530252.
Office action dated Oct. 5, 2017, issued in Russian Patent Application No. 2015106840.
English translation of Office action dated Oct. 5, 2017, issued in Russian Patent Application No. 2015106840.
European Patent Office, English language translation of abstract of Chinese patent publication No. 102025550.
European Patent Office, English language translation of abstract of Chinese patent publication No. 101873237.

\* cited by examiner

DISTRIBUTED PHYSICAL SECURITY SYSTEM

TECHNICAL FIELD

The present disclosure is directed at a distributed physical security system. More particularly, the present disclosure is directed at a distributed physical security system in which various server nodes of the system are clustered together when the system is operating.

BACKGROUND

A physical security system is a system that implements measures to prevent unauthorized persons from gaining physical access to an asset, such as a building, a facility, or confidential information. Examples of physical security systems include surveillance systems, such as a system in which cameras are used to monitor the asset and those in proximity to it; access control systems, such as a system that uses RFID cards to control access to a building; intrusion detection systems, such as a home burglary alarm system; and combinations of the foregoing systems.

A physical security system often incorporates computers. As this type of physical security system grows, the computing power required to operate the system increases. For example, as the number of cameras in a surveillance system increases, the requisite amount of computing power also increases to allow additional video to be stored and to allow simultaneous use and management of a higher number of cameras. Research and development accordingly continue into overcoming problems encountered as a physical security system grows.

SUMMARY

According to a first aspect, there is provided a method for sharing data in a physical security system that comprises a plurality of server nodes. The method comprises accessing, using one of the server nodes ("first node"), a node identifier identifying another of the server nodes ("second node"), wherein the first and second nodes comprise at least part of a server cluster and wherein the node identifier comprises at least part of cluster membership information identifying all and accessible by all server nodes in the server cluster; and sending the data from the first node to the second node.

The server cluster may comprise at least three server nodes.

The server nodes may comprise cameras, network video recorders, and access control servers.

The method may further comprise accessing, using the second node, a node identifier identifying the first node; and sending additional data from the second node to the first node.

The cluster membership information may comprise a node identifier uniquely identifying each of the server nodes in the server cluster; and a cluster identifier uniquely identifying the server cluster to which the server nodes belong.

Each of the server nodes in the server cluster may persistently store its own version of the cluster membership information locally.

The method may further comprise rebooting one of the server nodes ("rebooted server node") in the server cluster; and once the rebooted server node returns online, using the rebooted server node to perform a method comprising (i) accessing the cluster identifier identifying the server cluster; and (ii) automatically rejoining the server cluster.

The method may further comprise adding a new server node to the server cluster by performing a method comprising exchanging a version of the cluster membership information stored on the new server node with the version of the cluster membership information stored on one of the server nodes that is already part of the server cluster ("membership control node"); and synchronizing the versions of the cluster membership information stored on the new server node with the versions of the cluster membership information stored on all the server nodes in the cluster prior to the new server node joining the cluster.

Sending the data may comprise looking up, using the first node, a communication endpoint for the second node from the node identifier; and sending the data from the first node to the communication endpoint.

The communication endpoint and the node identifier may comprise entries in a network map relating node identifiers for all the server nodes in the server cluster to corresponding communication endpoints, and each of the server nodes in the server cluster may persistently store its own version of the network map locally.

The network map may permit each of the server nodes in the server cluster to send the data to any other of the server nodes in the server cluster without using a centralized server.

The data may be stored locally on the first node and the method may further comprise modifying the data using the first node, wherein sending the data from the first node to the second node comprises part of synchronizing the data on the first and second nodes after the first node has modified the data.

The data may comprise version information generated using a causality versioning mechanism and different versions of the data may be stored on the first and second nodes, and synchronizing the data may comprise comparing the version information stored on the first and second nodes and adopting on both of the first and second nodes the data whose version information indicates is more recent.

The data may comprise the node identifier of the first node, heartbeat state information of the first node, application state information of the first node, and version information, and sending the data may comprise disseminating the data to all the server nodes in the server cluster using a gossip protocol that performs data exchanges between pairs of the server nodes in the cluster.

The data may be periodically disseminated to all the server nodes in the server cluster.

The data may be sent to the second node when the first node joins the cluster.

A domain populated with entries that can be modified by any of the server nodes in the server cluster may be stored locally on each of the nodes in the server cluster, and the method may further comprise generating the version information using a causality versioning mechanism such that the version information indicates which of the server nodes has most recently modified one of the entries.

The application state information may comprise a top-level hash generated by hashing all the entries in the domain.

The method may further comprise comparing, using the second node, the top-level hash with a top-level hash generated by hashing a version of a corresponding domain stored locally on the second node; and if the top-level hashes differ, synchronizing the domains on both the first and second nodes using the version information.

A status entry that can only be modified by the first node may be stored locally on the first node, and the version information may comprise a version number that the first node increments whenever it modifies the status entry.

The application state information may comprise a status entity pair comprising a status entity identifier that identifies the status entry and the version number.

The method may further comprise comparing, using the second node, the version number received from the first node with a version number of a corresponding status entry stored locally on the second node; and if the versions numbers differ, updating the status entry stored locally on the second node with the status entry stored locally on the first node.

Updating the status entry may comprise sending from the first node to the second node additional status entries stored locally on the first node that were modified simultaneously with the status entry.

The first and second nodes may comprise at least part of a group of server nodes in the cluster to which the first node can send the data in a totally ordered manner to all of the server nodes in the group, and sending the data may comprise the first node sending the data to all of the server nodes in the group.

The data may comprise non-persistent data generated during the runtime of the physical security system.

The data may also comprise streaming video streamed from another of the server nodes in the server cluster through the first node to the second node.

According to another aspect, there is provided a system for sharing data in a physical security system, the system comprising a plurality of server nodes comprising a first node and a second node, wherein the first node comprises a processor communicatively coupled to a computer readable medium that has encoded thereon statements and instructions to cause the processor to perform a method comprising accessing a node identifier identifying the second node, wherein the first and second nodes comprise at least part of a server cluster and wherein the node identifier comprises at least part of cluster membership information identifying all and accessible by all the server nodes in the server cluster; and sending the data to the second node.

According to another aspect, there is provided a non-transitory computer readable medium having encoded thereon statements and instructions to cause a processor to perform a method for sharing data in a physical security system that comprises a plurality of server nodes, the method comprising accessing, using one of the server nodes ("first node"), a node identifier identifying another of the server nodes ("second node"), wherein the first and second nodes comprise at least part of a server cluster and wherein the node identifier comprises at least part of cluster membership information identifying all and accessible by all server nodes in the server cluster; and sending the data from the first node to the second node.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Figure 1:
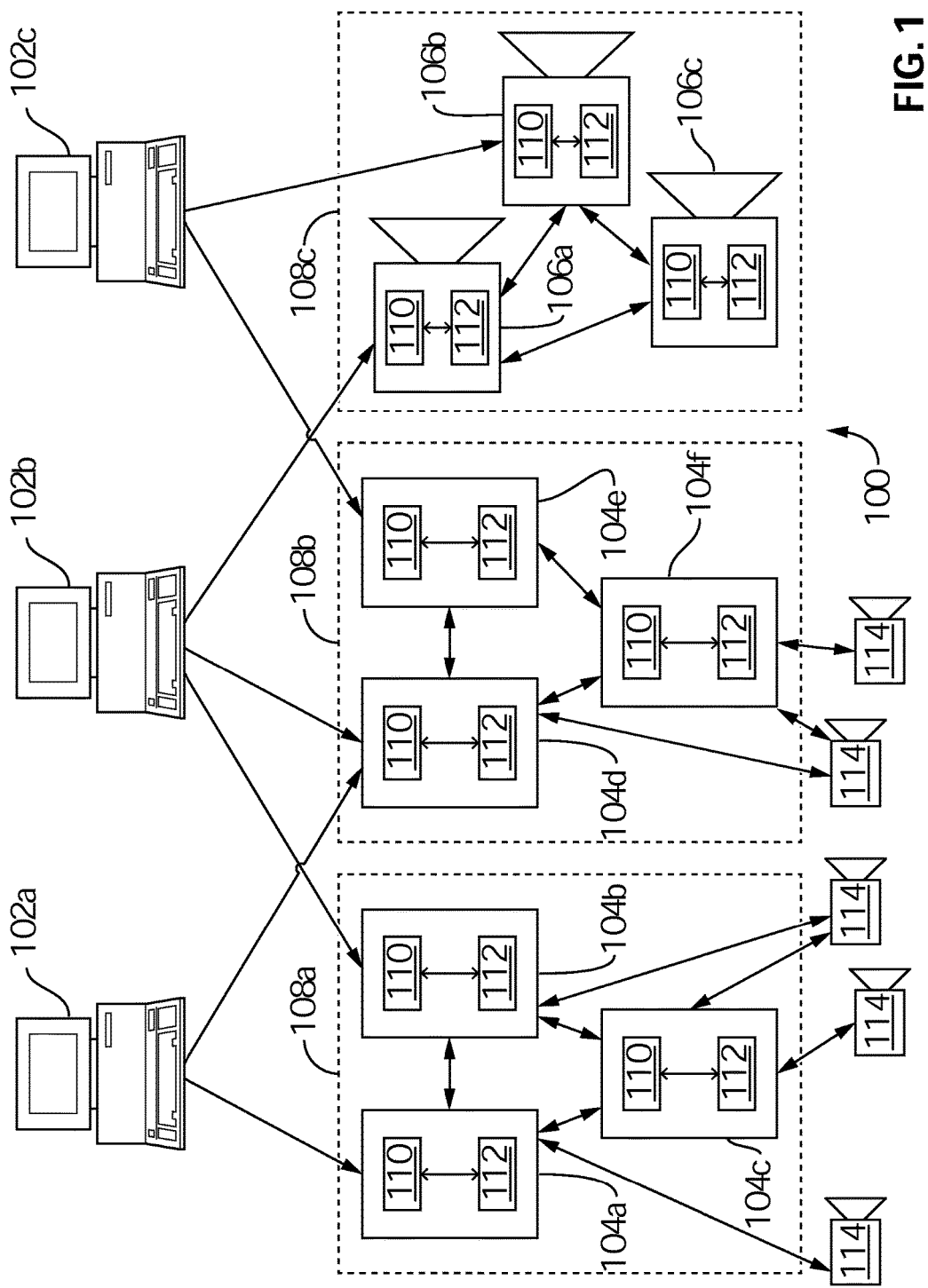
FIG. 1 is a block diagram of a distributed physical security system, according to one embodiment.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Once a surveillance system grows to include a certain number of cameras, it becomes impractical or impossible to operate the surveillance system using a single server because of storage capacity and processing power limitations. Accordingly, to accommodate the increased number of cameras, additional servers are added to the system. This results in a number of problems.

For example, a user of the surveillance system may want to be able to see what another user is viewing (that user's "view") and stream video that is captured using a camera in the system or that is stored on a server in the system even if the user is not directly connected to that camera or that server, respectively. Similarly, the user may want to be able to access user states (e.g.: whether another user of the system is currently logged into the system) and system events (e.g.: whether an alarm has been triggered) that are occurring elsewhere in the system, even if they originate on a server to which the user is not directly connected. In a conventional surveillance system that has been scaled out by adding more servers, a typical way to provide this functionality is to add a centralized gateway server to the system. A centralized gateway server routes system events, user states, views, and video from one server in the system to another through itself, thereby allowing the user to access or view these events, states, views, and video regardless of the particular server to which the user is directly connected. However, using a centralized gateway server gives the surveillance system a single point of failure, since if the centralized gateway server fails then the events, states, views, and video can no longer be shared. Using a centralized gateway server also increases the surveillance system's cost, since a server is added to the system and is dedicated to providing the centralized gateway server's functionality.

The user may also want common settings (e.g.: user access information in the form of usernames, passwords, access rights, etc.) to be synchronized across multiple servers in the system. In a conventional surveillance system that has been scaled out by adding more servers, this functionality is provided either by manually exporting settings from one server to other servers, or by using a centralized management server that stores all of these settings that other servers communicate with as necessary to retrieve these settings. Manually exporting settings is problematic because of relatively large synchronization delays, difficulty of use and setup, and because large synchronization delays prejudices system redundancy. Using the centralized management server suffers from the same problems as using the centralized gateway server, as discussed above.

The embodiments described herein are directed at a distributed physical security system, such as a surveillance system, that can automatically share data such as views, video, system events, user states, and user settings between two or more server nodes in the system without relying on a centralized server such as the gateway or management servers discussed above. The depicted embodiments are directed at a surveillance system in which users connect via clients to servers, such as network video recorders and cameras. Each of these servers and cameras is a "server node", and server nodes are grouped together in clusters, with each server node in the cluster being able to share data with the other server nodes in the cluster. To share this data, each of the server nodes runs services that exchange data based on a protocol suite that shares data between the server nodes in different ways depending on whether the data represents views, video, system events, user states, or user settings.

Referring now to FIG. 1, there is shown a distributed physical security system in the form of a surveillance system 100, according to one embodiment. The system 100 includes three clients 102a-c (first client 102a to third client 102c and collectively "clients 102"), six servers 104a-f (first server 104a to sixth server 104f and collectively "servers 104"), three server node cameras 106a-c (first node camera 106a to third node camera 106c and collectively "node cameras 106"); and five non-node cameras 114.

Each of the node cameras 106 and servers 104 includes a processor 110 and a memory 112 that are communicatively coupled to each other, with the memory 112 having encoded thereon statements and instructions to cause the processor 110 to perform any embodiments of the methods described herein. The servers 104 and node cameras 106 are grouped into three clusters 108a-c (collectively "clusters 108"): the first through third servers 104a-c are communicatively coupled to each other to form a first cluster 108a; the fourth through sixth servers 104d-f are communicatively coupled to each other to form a second cluster 108b; and the three node cameras 106 are communicatively coupled to each other to form a third cluster 108c. The first through third servers 104a-c are referred to as "members" of the first cluster 108a; the fourth through sixth servers 104d-f are referred to as "members" of the second cluster 108b; and the first through third node cameras 106a-c are referred to as "members" of the third cluster 108c.

Each of the servers 104 and node cameras 106 is a "server node" in that each is aware of the presence of the other members of its cluster 108 and can send data to the other members of its cluster 108; in contrast, the non-node cameras 114 are not server nodes in that they are aware only of the servers 104a,b,c,d,f to which they are directly connected. In the depicted embodiment, the server nodes are aware of all of the other members of the cluster 108 by virtue of having access to cluster membership information, which lists all of the server nodes in the cluster 108. The cluster membership information is stored persistently and locally on each of the server nodes, which allows each of the server nodes to automatically rejoin its cluster 108 should it reboot during the system 100's operation. A reference hereinafter to a "node" is a reference to a "server node" unless otherwise indicated.

While in the depicted embodiment none of the clusters 108 participate in intercluster communication, in alternative embodiments (not shown) the members of various clusters 108 may share data with each other. In the depicted embodiment the servers 104 are commercial off-the-shelf servers and the cameras 106,114 are manufactured by Avigilon™ Corporation of Vancouver, Canada; however, in alternative embodiments, other suitable types of servers 108 and cameras 106,114 may be used.

The first client 102a is communicatively coupled to the first and second clusters 108a,b by virtue of being communicatively coupled to the first and fourth servers 104a,d, which are members of those clusters 108a,b; the second client 102b is communicatively coupled to all three clusters 108 by virtue of being communicatively coupled to the second and fourth servers 104b,d and the first node camera 106a, which are members of those clusters 108; and the third client 102c is communicatively coupled to the second and third clusters 108b,c by virtue of being communicatively coupled to the fifth server 104e and the second node camera 106b, which are members of those clusters 108b,c. As discussed in more detail below, each of the nodes runs services that allow each of the nodes to communicate with each other according to a protocol suite 200 (shown in FIG. 2) to allow any one node to share data, whether that data be views, video, system events, user states, user settings, or another kind of data, to any other node using distributed computing; i.e., without using a centralized server. Each of the nodes has access to cluster membership information that identifies all the nodes that form part of the same cluster 108; by accessing this cluster membership information, data can be shared and synchronized between all the nodes of a cluster 108.

Figure 2:
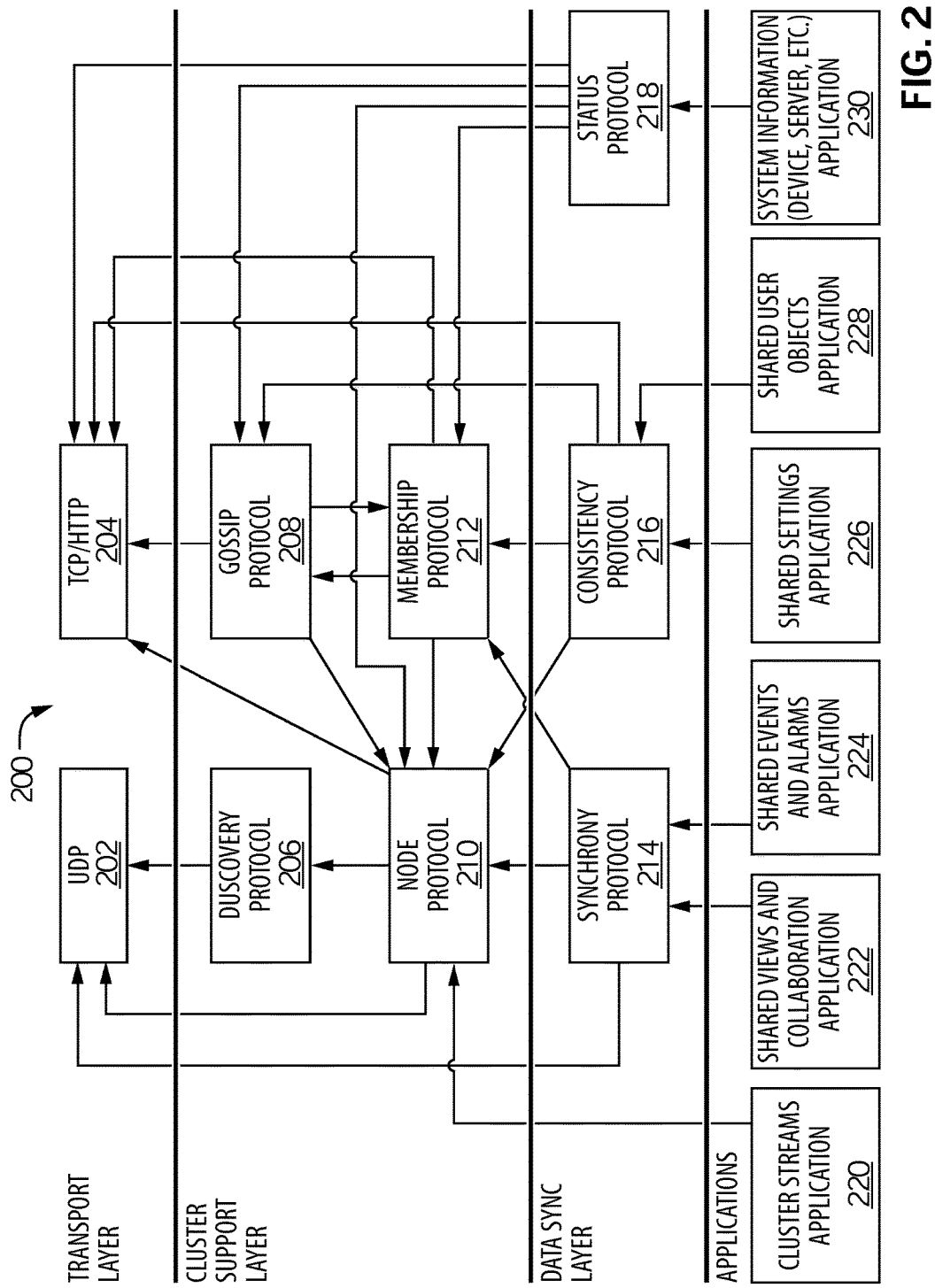
FIG. 2 is a block diagram of a protocol suit used by the system of FIG. 1.

FIG. 2 shows a block diagram of the protocol suite 200 employed by the nodes of the system 100. The protocol suite 200 is divided into three layers and includes the following protocols, as summarized in Table 1:

TABLE 1

Summary of the Protocol Suite 200

| Protocol Name | Protocol Layer | Receives Data from these Protocols and Applications | Sends Data to these Protocols |
|---|---|---|---|
| UDP 202 | Transport | Discovery Protocol 206, Node Protocol 210, Synchrony Protocol 214 | N/A |

TABLE 1-continued

Summary of the Protocol Suite 200

| Protocol Name | Protocol Layer | Receives Data from these Protocols and Applications | Sends Data to these Protocols |
|---|---|---|---|
| TCP/HTTP 204 | Transport | Node Protocol 210, Gossip Protocol 208, Membership Protocol 212, Consistency Protocol 216, Status Protocol 218 | N/A |
| Discovery Protocol 206 | Cluster Support | Node Protocol 210 | UDP 202 |
| Gossip Protocol 208 | Cluster Support | Membership Protocol 212, Consistency Protocol 216, Status Protocol 218 | TCP/HTTP 204, Node Protocol 210, Membership Protocol 212 |
| Node Protocol 210 | Cluster Support | Cluster Streams Application 220, Synchrony 214, Consistency Protocol 216, Membership Protocol 212, Status Protocol 218, Gossip Protocol 208 | UDP 202, TCP/HTTP 204, Discovery Protocol 206 |
| Membership Protocol 212 | Cluster Support | Synchrony Protocol 214, Gossip Protocol 208, Status Protocol 218, Consistency Protocol 216 | Gossip Protocol 208, Node Protocol 210, TCP/HTTP 204 |
| Synchrony Protocol 214 | Data Sync | Shared Views and Collaboration Application 222, Shared Events and Alarms Application 224 | UDP 202, Node Protocol 210, Membership Protocol 212 |
| Consistency Protocol 216 | Data Sync | Shared Settings Application 226, Shared User Objects Application 228 | Node Protocol 210, Membership Protocol 212, Gossip Protocol 208, TCP/HTTP 204 |
| Status Protocol 218 | Data Sync | System Information Application 230 | Gossip Protocol 208, Membership Protocol 212, Node Protocol 210, TCP/HTTP 204 |

A description of the function and operation of each of the protocols in the protocol suite 200 follows.

Transport Layer

The Transport Layer corresponds to layer 4 of the Open Systems Interconnection (OSI) model, and is responsible for providing reliable data transfer services between nodes to the cluster support, data synchronization, and application layers. The Transport Layer in the system 100 includes the UDP 202 and TCP/HTTP 204 protocols.

Cluster Support Layer

The Cluster Support Layer includes the protocols used to discover nodes, verify node existence, check node liveliness, determine whether a node is a member of one of the clusters 108, and determine how to route data between nodes.

Discovery Protocol 206

The Discovery protocol 206 is based on version 1.1 of the WS-Discovery protocol published by the Organization for the Advancement of Structured Information Standards (OASIS), the entirety of which is hereby incorporated by reference herein. In the depicted embodiment, XML formatting used in the published standard is replaced with Google™ Protobuf encoding.

The Discovery protocol 206 allows any node in the system 100 to identify the other nodes in the system 100 by multicasting Probe messages to those other nodes and waiting for them to respond. A node may alternatively broadcast a Hello message when joining the system 100 to alert other nodes to its presence without requiring those other nodes to first multicast the Probe message. Both the Probe and Hello messages are modeled on the WS-Discovery protocol published by OASIS.

Gossip Protocol 208

The Gossip protocol 208 is an epidemic protocol that disseminates data from one of the nodes to all of the nodes of that cluster 108 by randomly performing data exchanges between pairs of nodes in the cluster 108. The Gossip protocol 208 communicates liveliness by exchanging "heartbeat state" data in the form of a heartbeat count for each node, which allows nodes to determine when one of the nodes in the cluster 108 has left unexpectedly (e.g.: due to a server crash). The Gossip protocol 208 also communicates "application state" data such as top-level hashes used by the Consistency protocol 216 and status entity identifiers and their version numbers used by the Status protocol 218 to determine when to synchronize data between the nodes, as discussed in more detail below. The data spread using the Gossip protocol 208 eventually spreads to all of the nodes in the cluster 108 via periodic node to node exchanges.

A data exchange between any two nodes of the cluster 108 using the Gossip protocol 208 involves performing two remote procedure calls (RPCs) from a first node ("Node A") to a second node ("Node B") in the same cluster 108, as follows:

1. Node A sends a GreetingReq message to Node B, which contains a list of digests for all the nodes in the cluster 108 of which Node A is aware. For each node, a digest includes a unique node identifier and version information that is incremented each time either the heartbeat state or application state for that node changes. The version information may be, for example, a one-dimensional version number or a multi-dimensional version vector. Using a version vector allows the digest to summarize the history of the state changes that the node has undergone.
2. Node B sends a GreetingRsp message to Node A, which contains:
   (a) a list of digests for nodes about which Node B wishes to receive more information from Node A, which Node B determines from the version information sent to it in the GreetingReq message;
   (b) a list of digests for nodes about which Node A does not know form part of the cluster 108;
   (c) a list of one or both of heartbeat and application states that will bring Node A up-to-date on nodes for which it has out-of-date information; and
   (d) a list of nodes that Node A believes form part of the cluster 108 but that Node B knows have been removed from the cluster 108.
3. Node A then sends a ClosureReq message to Node B, in which Node A sends:
   (a) a list of digests for nodes about which Node A wishes to receive more information from Node B (e.g. Node A may request information for nodes of which Node A was unaware until Node B sent Node A the GreetingRsp message);
   (b) a list of states that will bring Node B up-to-date on nodes for which it has out-of-date information; and
   (c) a list of nodes that Node B believes form part of the cluster 108 but that Node A knows have been removed from the cluster 108.
4. Node B then sends a ClosureRsp message to Node A, in which Node B sends:
   (a) a list of states that will bring Node A up-to-date on nodes it is out-of-date on, in response to Node A's request in ClosureReq; and
   (b) a list of nodes that have been removed from the cluster 108 since GreetingRsp.

After Nodes A and B exchange RPCs, they will have identical active node lists, which include the latest versions of the heartbeat state and application state for all the nodes in the cluster 108 that both knew about before the RPCs and that have not been removed from the cluster 108.

Node Protocol 210

The Node protocol 210 is responsible for generating a view of the system 100's network topology for each node, which provides each node with a network map permitting it to communicate with any other node in the system 100. In some embodiments, the network map is a routing table. The network map references communication endpoints, which are an address (IP/FQDN), port number, and protocol by which a node can be reached over the IP network that connects the nodes.

The Node protocol 210 does this in three ways:
1. via a "Poke exchange", as described in further detail below;
2. via the Discovery protocol 206, which notifies the Node protocol 210 when a node joins or leaves the system 100. When a node joins the system 100 a "Poke exchange" is performed with that node; and
3. manually, in response to user input.

A Poke exchange involves periodically performing the following RPCs for the purpose of generating network maps for the nodes:
1. a Poke request, in which Node A sends to Node B a Node A self view and a list of other nodes known to Node A, as viewed by Node A, following which Node B updates its network map in view of this information; and
2. a Poke response, in which Node B sends to Node A a Node B self view and a list of other nodes known to Node B, as viewed by Node B, following which Node A updates its network map in view of this information.

The RPCs are performed over the TCP/HTTP protocol 204.

To reduce bandwidth usage, node information is only exchanged between Nodes A and B if the node information has changed since the last time it has been exchanged.

A Poke exchange is performed after the Discovery protocol 206 notifies the Node protocol 210 that a node has joined the system 100 because the Discovery protocol 206 advertises a node's communication endpoints, but does not guarantee that the node is reachable using those communication endpoints. For example, the endpoints may not be usable because of a firewall. Performing a Poke exchange on a node identified using the Discovery protocol 206 confirms whether the communication endpoints are, in fact, usable.

The Node protocol 210 can also confirm whether an advertised UDP communication endpoint is reachable; however, the Node protocol 210 in the depicted embodiment does not perform a Poke exchange over the UDP protocol 202.

For any given node in a cluster 108, a network map relates node identifiers to communication endpoints for each of the nodes in the same cluster 108. Accordingly, the other protocols in the protocol stack 200 that communicate with the Node protocol 210 can deliver messages to any other node in the cluster 108 just by using that node's node identifier.

Membership Protocol 212

The Membership protocol 212 is responsible for ensuring that each node of a cluster 108 maintains cluster membership information for all the nodes of the cluster 108, and to allow nodes to join and leave the cluster 108 via RPCs. Cluster membership information is shared between nodes of the cluster 108 using the Status protocol 218. Each node in the cluster 108 maintains its own version of the cluster membership information and learns from the Status protocol 218 the cluster membership information held by the other nodes in the cluster 108. As discussed in further detail below, the versions of cluster membership information held by two different nodes may not match because the version of cluster membership information stored on one node and that has been recently updated may not yet have been synchronized with the other members of the cluster 108.

For each node, the cluster membership information includes:
1. A membership list of all the nodes of the cluster 108, in which each of the nodes is represented by:
   (a) the node identifier, which is unique among all the nodes in the system 100;
   (b) the node's state, which is any one of:
      (i) Discover: the node is a member of the cluster 108 but has not been synchronized with the other members of the cluster 108 since having booted;
      (ii) Joining: the node is in the process of joining a cluster 108;

(iii) Syncing: the node is in the process of synchronizing data using the Synchrony, Consistency, and Status protocols 214,216,218 with the cluster 108 it has just joined;

(iv) Valid: the node has completed synchronizing the cluster membership information and is a valid node of the cluster 108; and (v) TimedOut: the node has become unresponsive and is no longer an active member of the cluster 108 (the node remains a member of the cluster 108 until removed by a user);

(c) a session token;

(d) the version number of the cluster membership information when the node joined the cluster 108; and (e) the version number of the cluster membership information the last time it was changed.

2. A gravestone list listing all the nodes that have been removed from the cluster 108, in which each removed node is represented by:

(a) that node's node identifier; and (b) the version of that node's cluster membership information when the node was removed.

In the depicted embodiment, a node is always a member of a cluster 108 that comprises at least itself; a cluster 108 of one node is referred to as a "singleton cluster". Furthermore, while in the depicted embodiment the membership information includes the membership list and gravestone list as described above, in alternative embodiments (not depicted) the membership information may be comprised differently; for example, in one such alternative embodiment the membership information lacks a gravestone list, while in another such embodiment the node's state may be described differently than described above.

When Node A wants to act as a new server node and wants to join a cluster 108 that includes Node B, it communicates with Node B and the following occurs:

1. Node A sends a cluster secret to Node B, which in the depicted embodiment is a key that Node B requires before letting another node join its cluster 108. One of the clients 102 provides the cluster secret to Node A. As Node B controls Node A's access to the cluster 108, Node B acts as a "membership control node".

2. Nodes A and B exchange their membership information. The versions of the membership information on Nodes A and B are updated to include the node identifiers of Node A and of all the nodes of the cluster 108 that Node A is joining.

3. Node A's state is changed to "Joining" as Node A joins the cluster.

4. Once joined, Node A's state is changed to "Syncing" as data is exchanged between Node A and the cluster 108 it has just joined. Node B also updates the version of the membership information stored on the all the other nodes of the cluster 108 using the Status protocol 218. The process of updating the versions of the membership information stored on Node A and all the members of the cluster 108 that Node A is joining is referred to as "synchronizing" the versions of the membership information stored on all of these nodes.

5. After synchronization is complete, Node A's state changes to Valid.

Data Synchronization Layer

The Data Synchronization Layer includes the protocols that enable data to be sent between the nodes in a cluster with different ordering guarantees and performance tradeoffs. The protocols in the Data Synchronization Layer directly use protocols in the Transport and Cluster Support Layers.

Synchrony Protocol 214

The Synchrony protocol 214 is used to send data in the form of messages from Node A to Node B in the system 100 such that the messages arrive at Node B in an order that Node A can control, such as the order in which Node A sends the messages. Services that transfer data using the Synchrony protocol 214 run on dedicated high priority I/O service threads.

In the depicted embodiment, the Synchrony protocol 214 is based on an implementation of virtual synchrony known as the Totem protocol, as described in Agarwal D A, Moser L E, Melliar-Smith P M, Budhia R K, "The Totem Multiple-Ring Ordering and Topology Maintenance Protocol", ACM Transactions on Computer Systems, 1998, pp. 93-132, the entirety of which is hereby incorporated by reference herein. In the Synchrony protocol 214, nodes are grouped together into groups referred to hereinafter in this description as "Synchrony rings", and a node on any Synchrony ring can send totally ordered messages to the other nodes on the same ring. The Synchrony protocol 214 modifies the Totem protocol as follows:

1. The Synchrony protocol 214 uses both a service identifier and a ring identifier to identify a Synchrony ring. The service identifier identifies all instances of a given Synchrony ring, whereas the ring identifier identifies a particular instance of a given Synchrony ring. For example, each time a node joins or leaves a Synchrony ring that ring's ring identifier will change, but not its service identifier. The service identifier allows a node to multicast totally ordered messages to the group of nodes that share the same service identifier (i.e. the group of nodes that belong to the same Synchrony ring).

2. In the Totem protocol, in some cases when the nodes are not sending messages the Synchrony ring seen by nodes does not reflect the final ring configuration that converges when the nodes begin messaging. The Synchrony protocol 214 allows nodes to send probe messages to each other to cause Synchrony rings to converge prior to the sending of non-probe messages.

3. The Totem protocol only allows ordered messages to be sent to all nodes that form part of a Synchrony ring. In contrast, the Synchrony protocol 214 uses a Dispatch module that abstracts the network layer from the Synchrony protocol 214 by providing an interface to broadcast to all reachable nodes in the system 100; unicast to each of multiple nodes in the system 100 using a list of destination node identifiers; and to unicast to a single node in the system 100 using its node identifier. The Dispatch module also supports multiplexing of services on the same IP port using message filtering and routing by service identifier. Outgoing messages from a node are sent to the subset of nodes having the same service identifier unless multicast.

4. The Synchrony protocol 214 uses fragmented messages and user payload chunking and coalescing to address problems arising from the maximum transmission unit size of approximately 1,500 bytes.

5. The Synchrony protocol 214 modifies the way nodes use Join messages, which are messages nodes use in the Totem protocol to join a Synchrony ring:

(a) Join messages are sent by nodes only if they have the lowest node identifier in the current set of operational nodes in the Synchrony ring.

(b) Nodes that do not have the lowest node identifier in their operational set unicast Join messages to the nodes with the lowest node identifier in their operational set.
(c) Join messages include the service identifier, and nodes that are not part of the corresponding Synchrony ring do not respond.

Relative to the Totem protocol, these modifications help reduce aggregate bandwidth used by nodes to join Synchrony rings.

6. The Synchrony protocol 214 detects and blacklists nodes that are unable to join a Synchrony ring due to some types of network misconfigurations. For example, a node that is able to send to, but not receive messages from, the other nodes will appear to the other nodes to only ever send probe messages since all other messages in the present embodiment are solicited, and accordingly will be blacklisted.
7. The Synchrony protocol 214 performs payload encryption and authenticity verification of messages.
8. The Synchrony protocol 214 limits the time each node can hold the token used in the Totem protocol; in the depicted embodiment, each node can hold the token for 15 ms.
9. The Synchrony protocol 214 implements a TCP friendly congestion avoidance algorithm.

As discussed in more detail below, the system 100 uses the Synchrony protocol for the Shared Views and Collaboration application 222 and the Shared Events and Alarms application 224; the data shared between members of a cluster 108 in these applications 222 is non-persistent and is beneficially shared quickly and in a known order.

Consistency Protocol 216

The Consistency protocol 216 is used to automatically and periodically share data across all the nodes of a cluster 108 so that the data that is shared using the Consistency protocol 216 is eventually synchronized on all the nodes in the cluster 108. The types of data that are shared using the Consistency protocol 216 are discussed in more detail below in the sections discussing the Shared Settings application 226 and the Shared User Objects application 228. Data shared by the Consistency protocol 216 is stored in a database on each of the nodes, and each entry in the database includes a key-value pair in which the key uniquely identifies the value and the keys are independent from each other. The Consistency protocol 216 synchronizes data across the nodes while resolving parallel modifications that different nodes may perform on different databases. As discussed in further detail below, the Consistency protocol 216 accomplishes this by first being notified that the databases are not synchronized; second, finding out which particular database entries are not synchronized; and third, finding out what version of the entry is most recent, synchronized, and kept.

In order to resolve parallel modifications that determine when changes are made to databases, each node that joins a cluster 108 is assigned a causality versioning mechanism used to record when that node makes changes to data and to determine whether changes were made before or after changes to the same data made by other nodes in the cluster 108. In the present embodiment, each of the nodes uses an interval tree clock (ITC) as a causality versioning mechanism. However, in alternative embodiments other versioning mechanisms such as vector clocks and version vectors can be used. The system 100 also implements a universal time clock (UTC), which is synchronized between different nodes using Network Time Protocol, to determine the order in which changes are made when the ITCs for two or more nodes are identical. ITCs are described in more detail in P. Almeida, C. Baquero, and V. Fonte, "Interval tree clocks: a logical clock for dynamic systems," *Princi. Distri. Sys., Lecture Notes in Comp. Sci.*, vol. 5401, pp. 259-274, 2008, the entirety of which is hereby incorporated by reference herein.

The directory that the Consistency protocol 216 synchronizes between nodes is divided into branches, each of which is referred to as an Eventual Consistency Domain (ECD). The Consistency protocol 216 synchronizes each of the ECDs independently from the other ECDs. Each database entry within an ECD is referred to as an Eventual Consistency Entry (ECE). Each ECE includes a key; a timestamp from an ITC and from the UTC, which are both updated whenever the ECE is modified; a hash value of the ECE generating using, for example, a Murmurhash function; the data itself; and a gravestone that is added if and when the ECE is deleted.

The hash value is used to compare corresponding ECDs and ECEs on two different nodes to determine if they are identical. When two corresponding ECDs are compared, "top-level" hashes for those ECDs are compared. A top-level hash for an ECD on a given node is generated by hashing all of the ECEs within that ECD. If the top-level hashes match, then the ECDs are identical; otherwise, the Consistency protocol 216 determines that the ECDs differ. To determine which particular ECEs in the ECDs differ, hashes are taken of successively decreasing ranges of the ECEs on both of the nodes. The intervals over which the hashes are taken eventually shrinks enough that the ECEs that differ between the two nodes are isolated and identified. A bi-directional skip-list can be used, for example, to determine and compare the hash values of ECD intervals.

Two nodes that communicate using the Consistency protocol 216 may use the following RPCs:
1. SetEntries: SetEntries transmits new or updated ECEs to a node, which inserts them into the appropriate ECDs.
2. GetEntries: GetEntries transmits a key or a range of keys to a node, which returns the ECEs corresponding to those one or more keys.
3. SynEntries: SynEntries transmits a key or a range of keys to a node, and the two nodes then compare hashes of successively decreasing ranges of ECEs to determine which ECEs differ between the two nodes, as described above. If the ECEs differ, the nodes merge their ECEs so that the same ECEs are stored on the nodes by comparing the ITC timestamps; if the ITC timestamps match, the nodes compare the UTC timestamps associated with the ECEs. These timestamps act as version information that allows the two nodes to adopt the ECEs that have been most recently modified, as indicated by those ECEs' version information.

When a node changes ECEs, that node typically calls SynEntries to inform the other nodes in the cluster 108 that the ECEs have been changed. If some of the nodes in the cluster 108 are unavailable (e.g.: they are offline), then the Gossip protocol 208 instead of SynEntries is used to communicate top-level hashes to the unavailable nodes once they return online. As alluded to in the section discussing the Gossip protocol 208 in the cluster 108 above, each of the nodes holds its top-level hash, which is spread to the other nodes along with a node identifier, version information, and heartbeat state using the Gossip protocol 208. When another node receives this hash, it compares the received top-level hash with its own top-level hash. If the top-level hashes are identical, the ECEs on both nodes match; otherwise, the ECEs differ.

If the ECEs differ, regardless of whether this is determined using SynEntries or the Gossip protocol 208, the node that runs SynEntries or that receives the top-level hash synchronizes the ECEs.

Status Protocol 218

As discussed above, the Gossip protocol 208 shares throughout the cluster 108 status entity identifiers and their version numbers ("status entity pair") for nodes in the cluster 108. Exemplary status entity identifiers may, for example, represent different types of status data in the form of status entries such as how much storage the node has available; which devices (such as the non-node cameras 114) are connected to that node; which clients 102 are connected to that node; and cluster membership information. When one of the nodes receives this data via the Gossip protocol 208, it compares the version number of the status entity pair to the version number of the corresponding status entry it is storing locally. If the version numbers differ, the Status protocol 218 commences an RPC ("Sync RPC") with the node from which the status entity pair originates to update the corresponding status entry.

A status entry synchronized using the Status protocol 218 is uniquely identified by both a path and a node identifier. Unlike the data synchronized using the Consistency protocol 216, the node that the status entry describes is the only node that is allowed to modify the status entry or the status entity pair. Accordingly, and unlike the ECDs and ECEs synchronized using the Consistency protocol 216, the version of the status entry for Node A stored locally on Node A is always the most recent version of that status entry.

If Node A modifies multiple status entries simultaneously, the Status protocol 218 synchronizes all of the modified status entries together to Node B when Node B calls the Sync RPC. Accordingly, the simultaneously changed entries may be dependent on each other because they will be sent together to Node B for analysis. In contrast, each of the ECEs synchronized using the Consistency protocol 216 is synchronized independently from the other ECEs, so ECEs cannot be dependent on each other as Node B cannot rely on receiving entries in any particular order.

Applications

Each of the nodes in the system 100 runs services that implement the protocol suite 200 described above. While in the depicted embodiment one service is used for each of the protocols 202-218, in alternative embodiments (not depicted) greater or fewer services may be used to implement the protocol suite 200. Each of the nodes implements the protocol suite 200 itself; consequently, the system 100 is distributed and is less vulnerable to a failure of any single node, which is in contrast to conventional physical security systems that use a centralized server. For example, if one of the nodes fails in the system 100 ("failed node"), on each of the remaining nodes the service running the Status protocol 218 ("Status service") will determine that the failed node is offline by monitoring the failed node's heartbeat state and will communicate this failure to the service running the Node and Membership protocols 210,212 on each of the other nodes ("Node service" and "Membership service", respectively). The services on each node implementing the Synchrony and Consistency protocols 214,216 ("Synchrony service" and "Consistency service", respectively) will subsequently cease sharing data with the failed node until the failed node returns online and rejoins its cluster 108.

Figure 8:
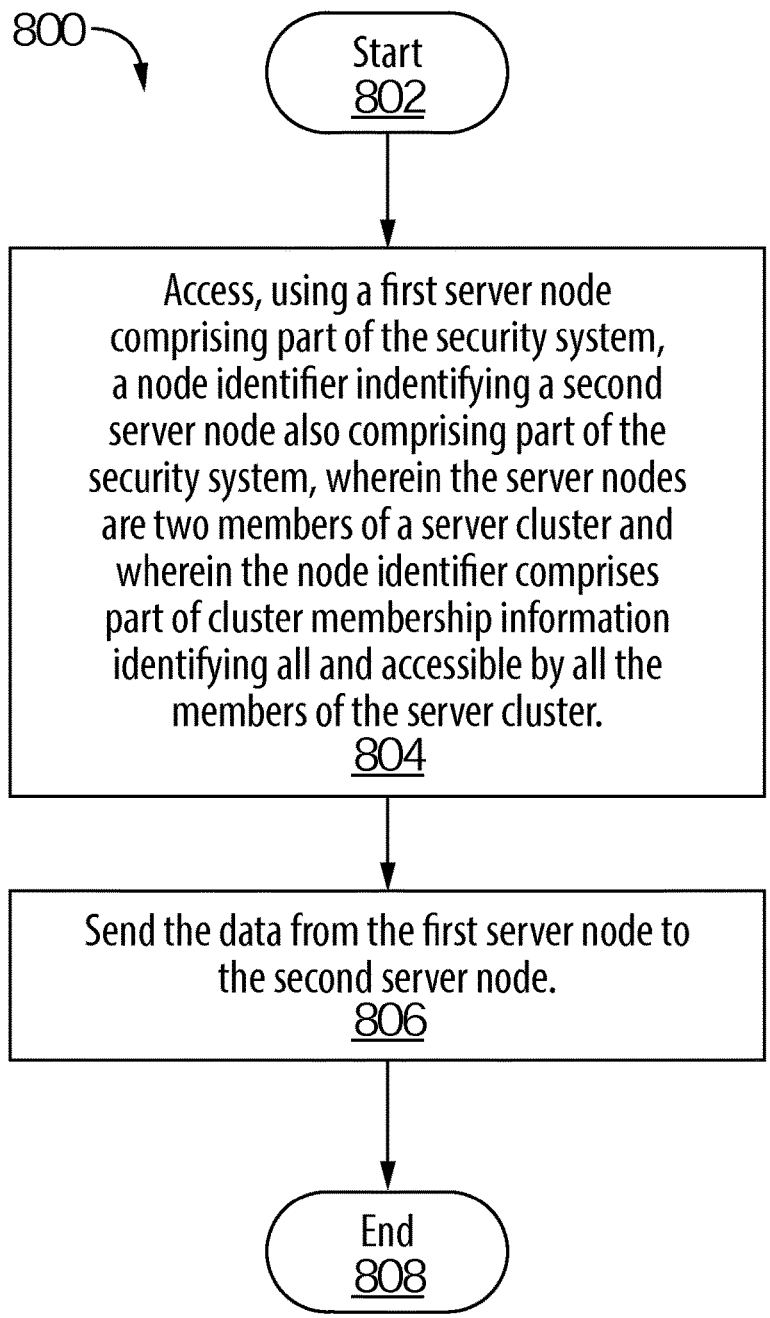
FIG. 8 is a method for sharing data in a physical security system, according to another embodiment.

The following describes the various applications 220-230 that the system 100 can implement. The applications 220-230 are various embodiments of the exemplary method for sharing data 800 depicted in FIG. 8. The method 800 begins at block 802 and proceeds to block 804 where a first node in the system 100 accesses a node identifier identifying another node in the system 100. Both the first and second nodes are members of the same server cluster 108. The node identifier that the first node accesses is part of the cluster membership information that identifies all the members of the cluster 108. The cluster membership information is accessible by all the members of the cluster 108. In the depicted embodiments each of the members of the cluster 108 stores its own version of the cluster membership information persistently and locally; however, in alternative embodiments (not depicted), the cluster membership information may be stored one or both of remotely from the nodes and in a central location. After accessing the node identifier for the second node, the first node sends the data to the second node at block 806, following which the method 800 ends at block 808. For example, when using the Node service described above, the Synchrony and Consistency services running on the first node are able to send the data to the second node by using the second node's node identifier, and by delegating to the Node service responsibility for associating the second node's communication endpoint to its node identifier. Sending the data from the first node to the second node at block 806 can comprise part of a bi-directional data exchange, such as when data is exchanged in accordance with the Gossip protocol 208.

Shared Settings Application 226 and Shared User Objects Application 228

During the system 100's operation, persistently stored information is transferred between the nodes of a cluster 108. Examples of this real-time information that the shared settings and shared user objects applications 226,228 share between nodes are shared settings such as rules to implement in response to system events such as an alarm trigger and user objects such as user names, passwords, and themes. This type of data ("Consistency data") is shared between nodes using the Consistency protocol 216; generally, Consistency data is data that does not have to be shared in real-time or in total ordering, and that is persistently stored by each of the nodes. However, in alternative embodiments (not depicted), Consistency data may be non-persistently stored.

Figure 3:
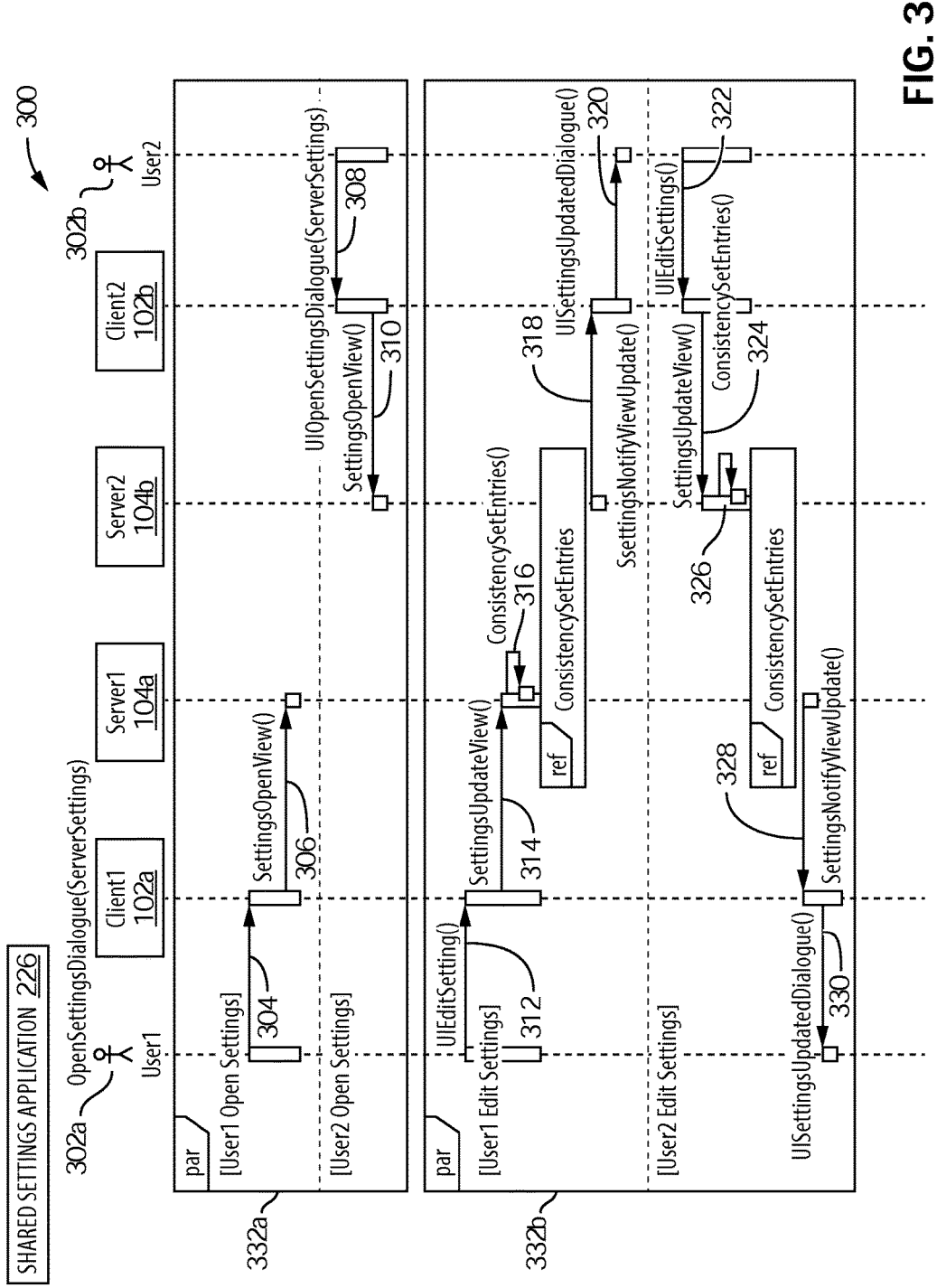
FIG. 3 is a UML sequence diagram showing how the system of FIG. 1 shares settings between different system users.

FIG. 3 shows a UML sequence diagram 300 in which Consistency data in the form of a user settings are shared between first and second users 302a,b (collectively, "users 302"). The users 302, the first and second clients 102a,b, and the first and second servers 104a,b, which are the first and second nodes in this example, are objects in the diagram 300. The servers 104a,b form part of the same cluster 108a. As the servers 104a,b with which the clients 102a,b communicate are not directly connected to each other, the Consistency protocol 216 is used to transfer data between the two servers 104a,b, and thus between the two users 302. Although the depicted embodiment describes sharing settings, in an alternative embodiment (not depicted) the users 302 may analogously share user objects.

The diagram 300 has two frames 332a,b. In the first frame 332a, the first user 302a instructs the first client 102a to open a settings panel (message 304), and the client 102a subsequently performs the SettingsOpenView( ) procedure (message 306), which transfers the settings to the first server 104a. Simultaneously, the second user 302b instructs the second client 102b analogously (messages 308 and 310). In the second frame 332b, the users 302 simultaneously edit their settings. The first user 302a edits his settings by having the first client 102a run UIEditSetting( ) (message 312), following which the first client 102a updates the settings stored on the first server 104*a* by having the first server 104*a* run SettingsUpdateView( ) (message 314). The first server 104*a* then runs ConsistencySetEntries( ) (message 316), which performs the SetEntries procedure and which transfers the settings entered by the first user 302*a* to the second server 104*b*. The second server 104*b* then sends the transferred settings to the second client 102*b* by calling SettingsNotifyViewUpdate( ) (message 318), following which the second client 102*b* updates the second user 302*b* (message 320). Simultaneously, the second user 302*b* analogously modifies settings and sends those settings to the first server 104*a* using the Consistency protocol 216 (messages 322, 324, 326, 328, and 330). Each of the servers 104*a,b* persistently stores the user settings so that they do not have to be resynchronized between the servers 104*a,b* should either of the servers 104*a,b* reboot.

Shared Events and Alarms Application 224

During the system 100's operation, real-time information generated during runtime is transferred between the nodes of a cluster 108. Examples of this real-time information that the shared events and alarms application 224 shares between nodes are alarm state (i.e. whether an alarm has been triggered anywhere in the system 100); system events such as motion having been detected, whether a device (such as one of the node cameras 106) is sending digital data to the rest of the system 100, whether a device (such as a motion detector) is connected to the system 100, whether a device is currently recording, whether an alarm has occurred or has been acknowledged by the users 302, whether one of the users 302 is performing an audit on the system 100, whether one of the servers 104 has suffered an error, whether a device connected to the system has suffered an error, whether a point-of-sale text transaction has occurred; and server node to client notifications such as whether settings/data having changed, current recording state, whether a timeline is being updated, and database query results. In the present embodiment, the data transferred between nodes using the Synchrony protocol 214 is referred to as "Synchrony data", is generated at run-time, and is not persistently saved by the nodes.

Figure 4:
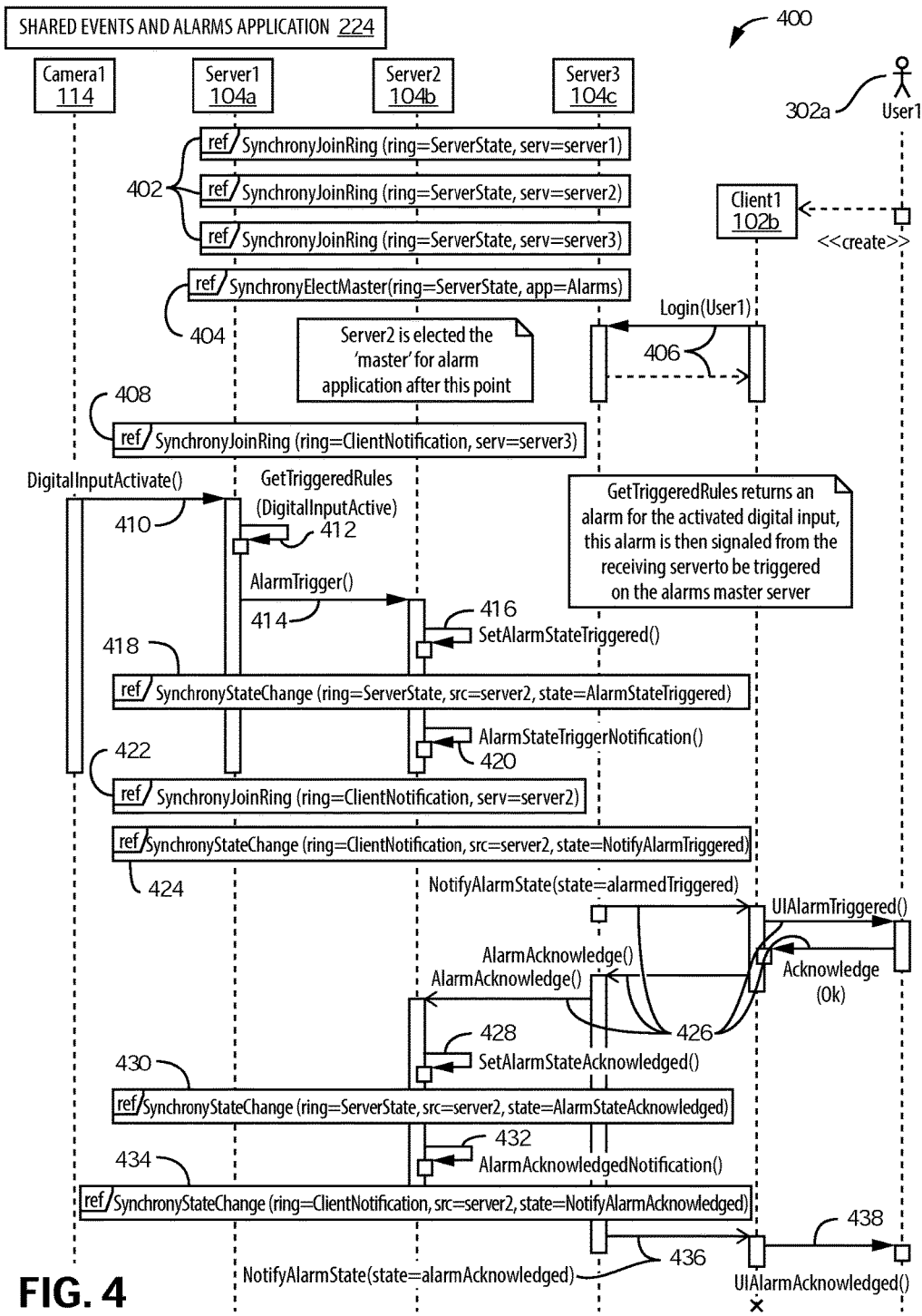
FIG. 4 is a UML sequence diagram showing how the system of FIG. 1 shares a state between different system users.

FIG. 4 shows a UML sequence diagram 400 in which an alarm notification is shared between the servers 104 using the Synchrony protocol 214. The objects in the diagram 400 are one of the non-node cameras 114, the three servers 104 in the first cluster 108*a*, and the second client 102*b*, which is connected to one of the servers 104*c* in the first cluster 108*a*.

At the first three frames 402 of the diagram 400, each of the servers 104 joins a Synchrony ring named "ServerState" so that the state of any one of the servers 104 can be communicated to any of the other servers 104; in the depicted embodiment, the state that will be communicated is "AlarmStateTriggered", which means that an alarm on one of the servers 108 has been triggered by virtue of an event that the non-node camera 114 has detected. At frame 404, the second server 104*b* is elected the "master" for the Alarms application; this means that it is the second server 104*b* that determines whether the input from the non-node camera 114 satisfies the criteria to transition to the AlarmStateTriggered state, and that sends to the other servers 104*a,c* in the Synchrony ring a message to transition them to the AlarmStateTriggered state as well.

The second user 302*b* logs into the third server 104*c* after the servers 104 join the ServerState Synchrony ring (message 406). Subsequent to the user 302*b* logging in, the third server 104*c* joins another Synchrony ring named "ClientNotification" (message 408); as discussed in further detail below, this ring is used to communicate system states to the user 302*b*, whereas the ServerState Synchrony ring is used to communicate only between the servers 104. The non-node camera 114 sends a digital input, such as an indication that a door or window has been opened, to the first server 104*a* (message 410), following which the first server 104*a* checks to see whether this digital input satisfies a set of rules used to determine whether to trigger an alarm in the system 100 (message 412). In the depicted embodiment, the second first server 104*a* determines that an alarm should be triggered, and accordingly calls AlarmTrigger( ) (message 414), which alerts the second server 104*b* to change states. The second server 104 then transitions states to AlarmStateTriggered (message 416) and sends a message to the ServerState Synchrony ring that instructs the other two servers 104*a,c* to also change states to AlarmStateTriggered (frame 418). After instructing the other servers 104*a,c*, the second server 104*b* runs AlarmTriggerNotification( ) (message 420), which causes the second server 104*b* to also join the ClientNotification Synchrony ring (frame 422) and pass a message to the ClientState Synchrony ring that causes the third server 104*c*, which is the other server on the ClientState Synchrony ring, to transition to a "NotifyAlarmTriggered" state (frame 424). Once the third server 104*c* changes to this state it directly informs the second client 102*b* that the alarm has been triggered, which relays this message to the second user 302*b* and waits for the user second 302*b* to acknowledge the alarm (messages 426). Once the second user 302*b* acknowledges the alarm, the second server 104*b* accordingly changes states to "AlarmStateAcknowledged" (message 428), and then sends a message to the ServerState Synchrony ring so that the other two servers 104*a,c* correspondingly change state as well (frame 430). The second server 104*b* subsequently changes state again to "NotifyAlarmAcknowledged" (message 432) and sends a message to the third server 104*c* via the ClientNotification Synchrony ring to cause it to correspondingly change state (frame 434). The third server 104*c* then notifies the client 102*c* that the system 100 has acknowledged the alarm (message 436), which relays this message to the second user 302*b* (message 438).

In an alternative embodiment (not depicted) in which the second server 104*b* fails and can no longer act as the master for the Synchrony ring, the system 100 automatically elects another of the servers 104 to act as the master for the ring. The master of the Synchrony ring is the only server 104 that is allowed to cause all of the other nodes on the ring to change state when the Synchrony ring is used to share alarm notifications among nodes.

Figure 7:
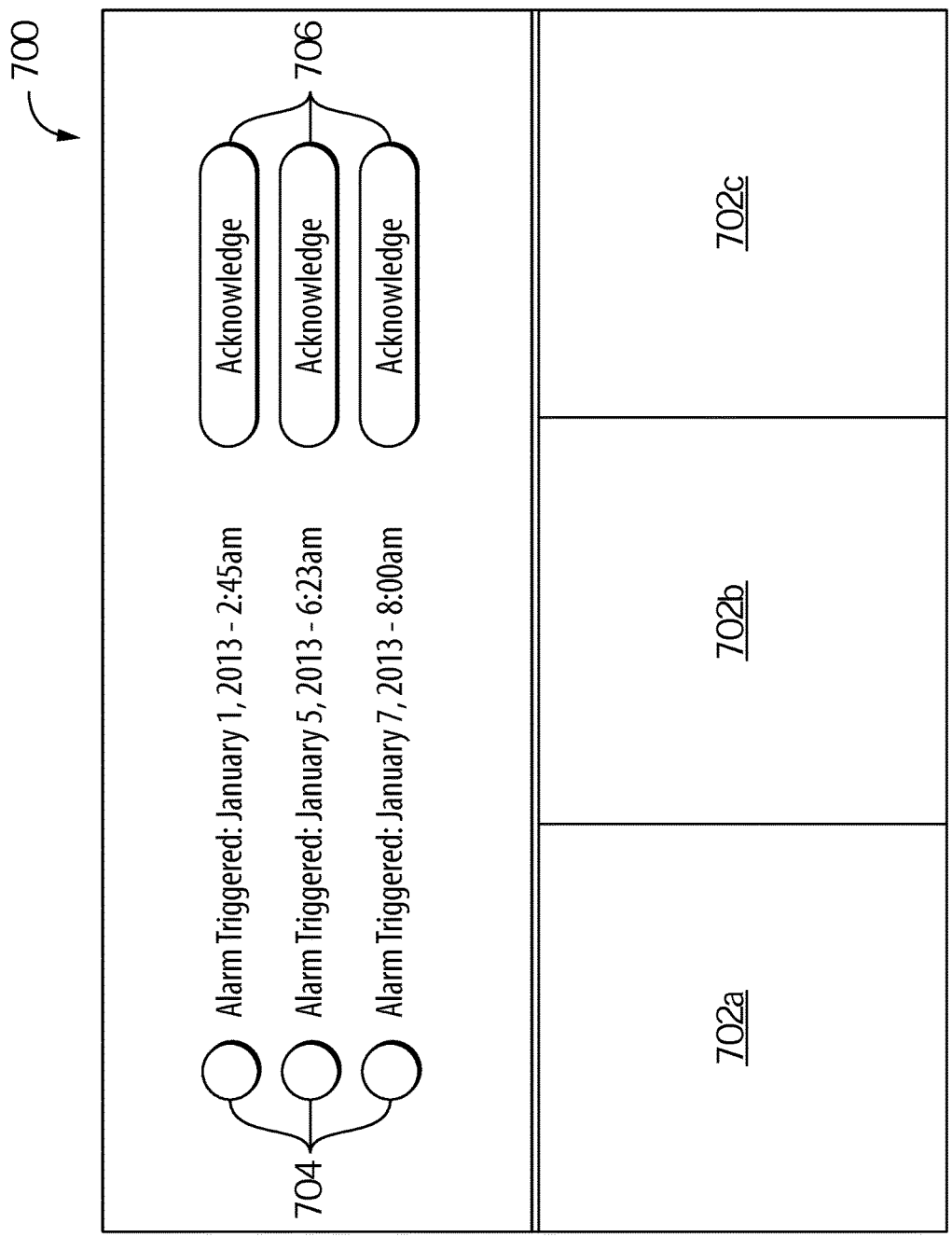
FIG. 7 is a view seen by a user of the system of FIG. 1.

FIG. 7 shows an exemplary view 700 presented to the users 302 when acknowledging an alarm state in accordance with the diagram 400 of FIG. 4. The view 700 includes video panels 702*a-c* (collectively "panels 702") showing real time streaming video from the non-node camera 114; alerts 704 indicating that an alarm has been triggered as a result of what the non-node camera 114 is recording; and an acknowledge button 706 that the second user 302*b* clicks in order to acknowledge the alarm having been triggered.

Shared Views and Collaboration Application 222

The users 302 of the system 100 may also want to share each others' views 700 and collaborate, such as by sending each other messages and talking to each other over the system 100, while sharing views 700. This shared views and collaboration application 222 accordingly allows the users 302 to share data such as view state and server to client notifications such as user messages and share requests. This type of data is Synchrony data that is shared in real-time.

Figure 5:
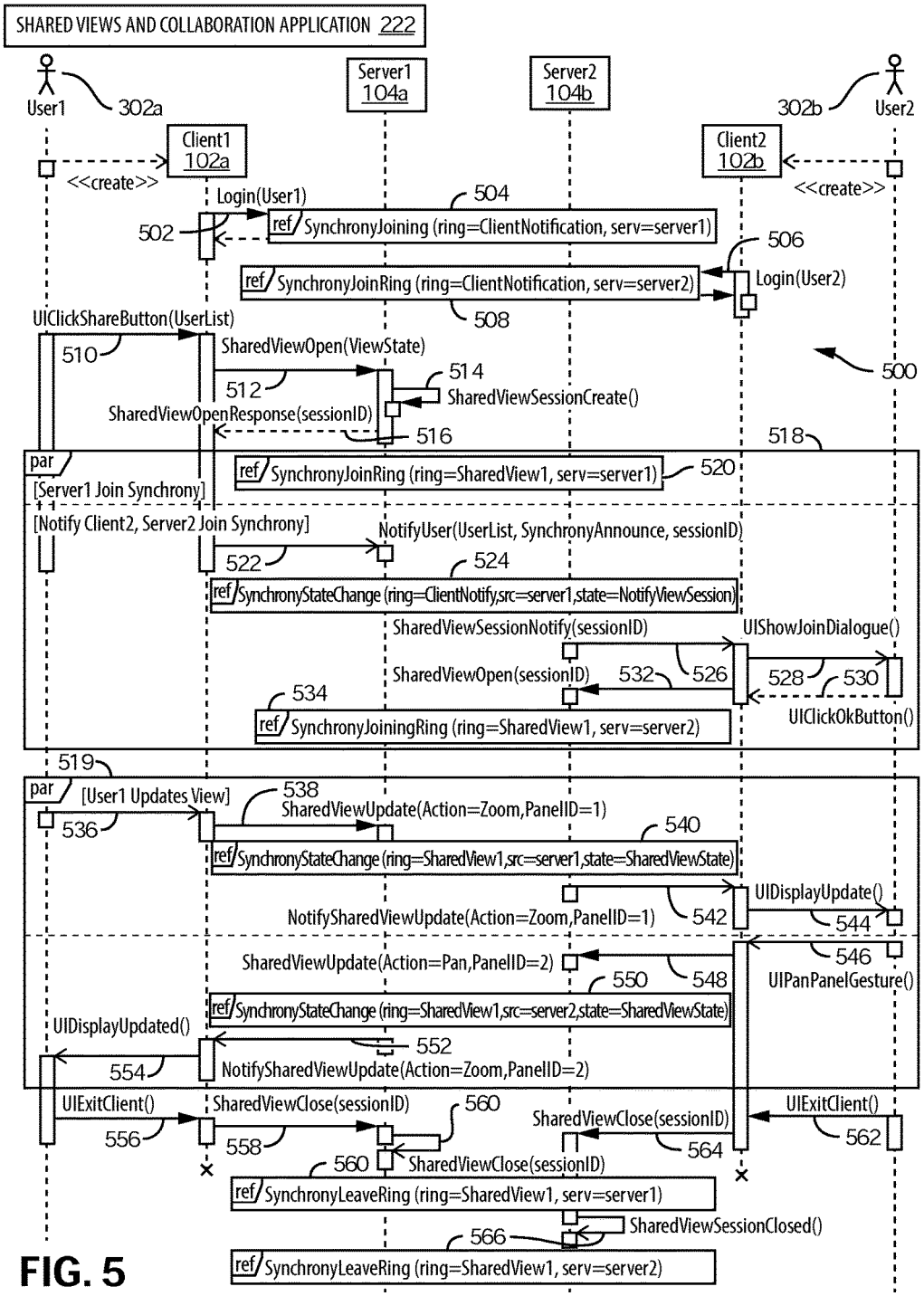
FIG. 5 is a UML sequence diagram showing how the system of FIG. 1 shares a view between different system users.

FIG. 5 shows a UML sequence diagram 500 in which views 700 are shared between the users 302 using the Synchrony protocol 214. The diagram 500 includes six objects: the first and second users 302a,b, the first and second clients 102a,b to which the first and second users are respectively connected, and the first and second servers 104a,b to which the first and second clients 102a,b are respectively connected.

The first user 302a logs into the first server 104a via the first client 102a (message 502), following which the first server 104a joins the ClientNotification Synchrony ring (frame 504). Similarly, the second user 302b logs into the second server 104b via the second client 102b (message 506), following which the second server 104b also joins the ClientNotification Synchrony ring (frame 508).

The first user 302a then instructs the first client 102a that he wishes to share his view 700. The first user 302a does this by clicking a share button (message 510), which causes the first client 102a to open the view 700 to be shared ("shared view 700") on the first server 104a (message 512). The first server 104a creates a shared view session (message 514), and then sends the session identifier to the first client 102a (message 516).

At one frame 518 each of the clients 102 joins a Synchrony ring that allows them to share the shared view 700. The first server 104a joins the SharedView1 Synchrony ring at frame 520. Simultaneously, the first client 106a instructs the first server 104a to announce to the other server 104b via the Synchrony protocol 214 that the first user 302a's view 700 can be shared by passing to the first server 104a a user list and the session identifier (message 522). The first server 104a does this by sending a message to the second server 104b via the ClientNotify Synchrony ring that causes the second server 104 to change to a NotifyViewSession state. In the NotifyViewSession state, the second server 104b causes the second client 106b to prompt the second user 302b to share the first user 302a's view 700 (messages 526 and 528), and the second user 302b's affirmative response is relayed back to the second server 104b (messages 530 and 532). The second server 104b subsequently joins the SharedView1 Synchrony ring, which is used to share the first user 302a's view 700.

At a second frame 519 the users 106 each update the shared view 700, and the updates are shared automatically with each other. The first user 302a zooms into a first panel 702a in the shared view 700 (message 536), and the first client 102a relays to the first server 104a how the first user 302a zoomed into the first panel 702a (message 538). The first server 104a shares the zooming particulars with the second server 104b by passing them along the SharedView1 Synchrony ring (frame 540). The second server 104b accordingly updates the shared view 700 as displayed on the second client 106b (message 542), and the updated shared view 700 is then displayed to the second user 302b (message 544). Simultaneously, the second user 302b pans a second panel 702b in the shared view 700 (message 546), and the second client 102b relays to the second server 104b how the second user 302b panned this panel 702b (message 548). The second server 104b then shares the panning particulars with the first server 104a by passing them using the SharedView1 Synchrony ring (frame 550). The first server 104a accordingly updates the shared view 700 as displayed on the first client 106b (message 552), and the updated shared view 700 is then displayed to the first user 302a (message 556).

After the second frame 519, the first user 302a closes his view 700 (message 556), which is relayed to the first server 104a (message 558). The first server 104a consequently leaves the SharedView1 Synchrony ring (message and frame 560). The second user 302b similarly closes his view 700, which causes the second server 104b to leave the SharedView1 Synchrony ring (messages 562 and 564, and message and frame 566).

In the example of FIG. 5, the users 302 pan and zoom the shared view 700. In alternative embodiments (not depicted) the users 302 may modify the shared view 700 in other ways. For example, the users 302 may each change the layout of the panels 702; choose whether video is to be displayed live or in playback mode, in which case the users 302 are also able to pause, play, or step through the video; and display user objects such as maps or web pages along with information about the user object such as revision history. In these alternative embodiments, examples of additional state information that is synchronized using a Synchrony ring include whether a video is being played, paused, or stepped through and the revision history of the user object.

Cluster Streams Application 220

Figure 6:
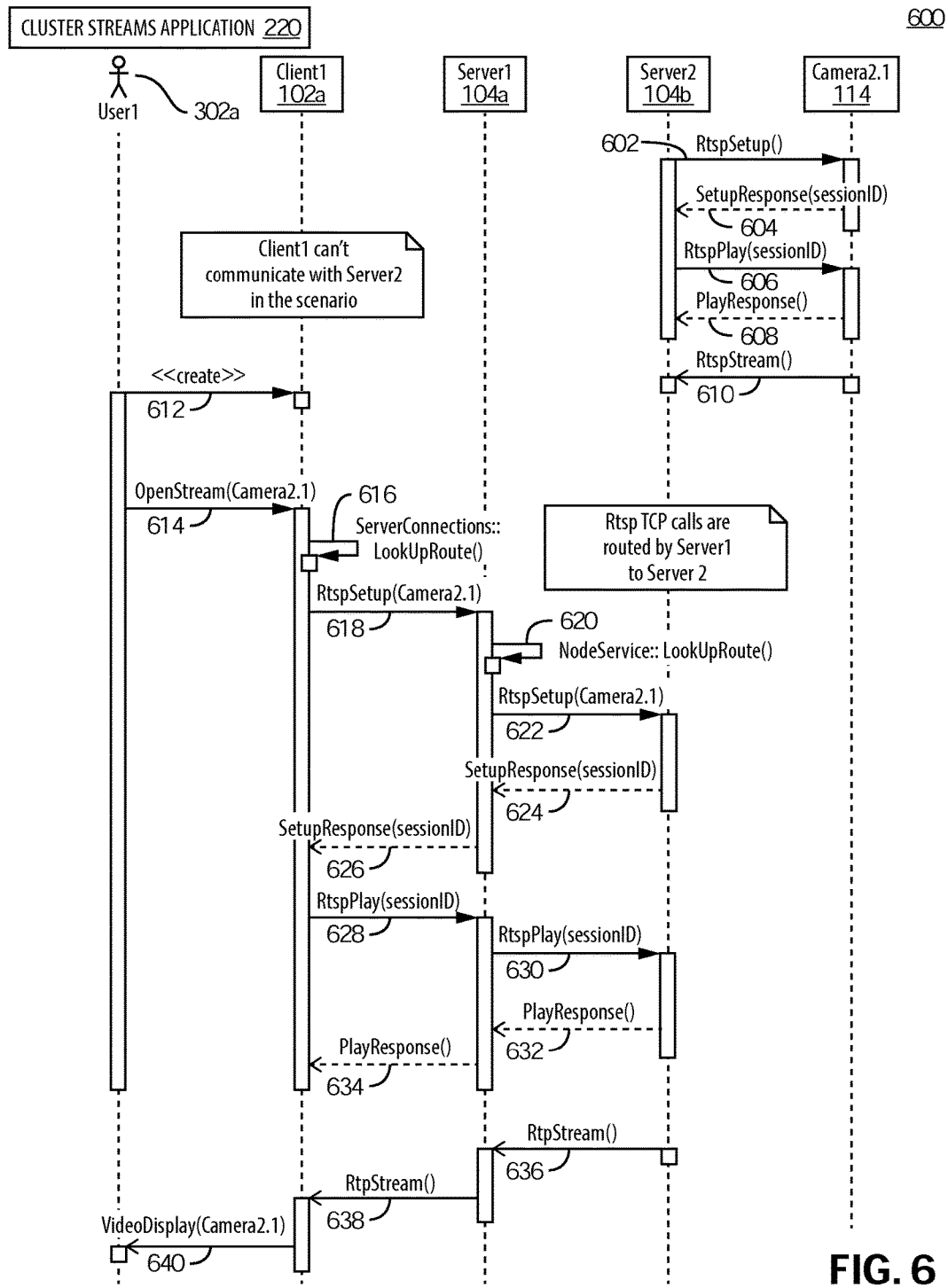
FIG. 6 is a UML sequence diagram showing how the system of FIG. 1 shares streams between different system users.

One of the users 302 may also want to stream video from one of the cameras 106,114 if a point-to-point connection between that user 302 and that camera 106,114 is unavailable; the cluster streams application 220 enables this functionality. FIG. 6 shows a UML sequence diagram 600 in which video is streamed from the non-node camera 114 to the first user 302a through the first and second servers 104a,b and the first client 102a. The UML diagram has five objects: the first user 302a, the first client 102a, the first and second servers 104a,b, and the non-node camera 114. The first client 102a can directly communicate with the first server 104a, but cannot directly communicate with the second server 104b. However, the first and second servers 104a,b can communicate directly with each other. Additionally, while the second server 104b and the non-node camera 114 can communicate directly with each other, the first server 104a and the non-node camera 114 cannot directly communicate.

The second server 104b first establishes a session with the non-node camera 114 so that video is streamed from the non-node camera 114 to the second server 104b. The second server 104b first sets up a Real Time Streaming Protocol (RTSP) session with the non-node camera 114 (messages 602 and 604), and instructs the non-node camera 114 to send it video (messages 606 and 608). The non-node camera 114 subsequently commences streaming (message 610).

The first user 302a establishes a connection with the first client 102a (message 612) and then instructs the first client 102a to open a window showing the streaming video (message 614). The first client 102a then calls LookupRoute( ) to determine to which server 104 to connect (message 616); because the first client 102a cannot connect directly to the second server 104b, it sets up an RTSP connection with the first server 104a (message 618). The first server 104b then calls LookupRoute( ) to determine to which node to connect to access the real-time video, and determines that it should connect with the second server 104b (message 620). The first server 104a subsequently sets up an RTSP connection with the second server 104b (message 622), and the second server 104b returns a session identifier to the first server 104a (message 624). The first server 104a relays the session identifier to the first client 102a (message 626). Using this session identifier, the first client 102a instructs the second server 104b to begin playing RTSP video (messages 628 to 634), and the second server 104b subsequently streams video to the first user 302a via the second server 104b, then the first server 104a, and then the first client 102a (messages 636 to 640).

While FIG. 6 routes video from one of the non-node cameras 114 connected to one of the servers 104 in a cluster 108 to other servers 104 in the same cluster 108, in alternative embodiments (not depicted) video may also be routed from one of the node cameras 106 in a cluster 108 through the other node cameras 106 in the same cluster 108.

Rebooting

Figure 9:
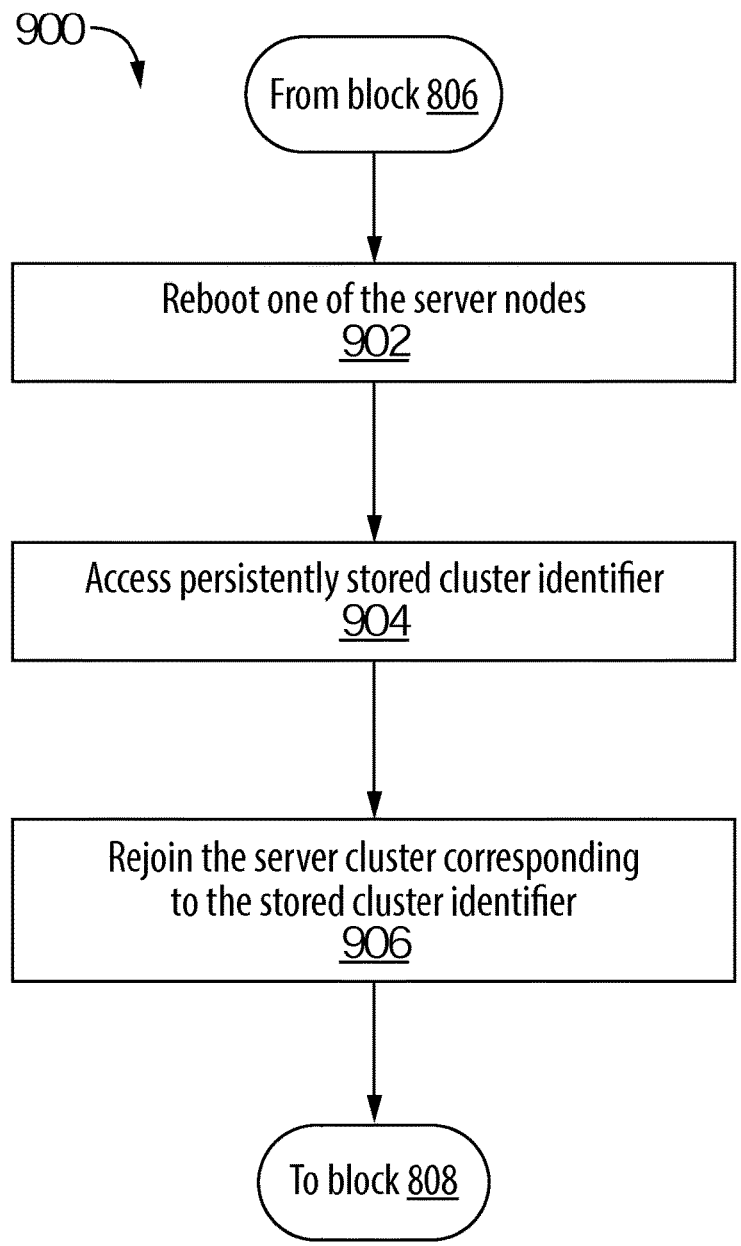
FIG. 9 is a method for automatically rejoining a cluster, according to another embodiment.

In the present embodiment, the cluster membership information is persistently stored locally on each of the nodes. When one of the nodes reboots, it automatically rejoins the cluster 108 of which it was a member prior to rebooting. This is depicted in the exemplary method 900 shown in FIG. 9. After performing block 806, one of the nodes in the cluster 108 reboots (block 902). Upon rebooting, this node accesses the persistently stored cluster membership information that identifies the cluster 108 of which it was a member prior to rebooting (block 904), and subsequently rejoins this cluster 108 (block 906) before returning to block 808. Having the nodes automatically rejoin a cluster 108 following rebooting is beneficial in that it helps the system 100 recover following restarting of any one or more of its servers. As each of the nodes persistently stores the Consistency information, upon rejoining the cluster 108 only that Consistency information that has changed since the node last left the cluster 108 is synchronized again, thereby saving bandwidth.

While certain exemplary embodiments are depicted, alternative embodiments, which are not depicted, are possible. For example, while in the depicted embodiment the node cameras 106 and non-node cameras 114 are distinct from each other, in alternative embodiments (not depicted) a single camera may be simultaneously a node camera and a non-node camera. For example, in FIG. 1 the first camera 106a is a node that is a member of the third cluster 108c; however, if the first camera 106a were also directly coupled to the fifth server 104e but retained only its cluster membership information for the third cluster 108c, the first camera 106a would remain a member of the third cluster 108c while simultaneously acting as a non-node camera 114 from the perspective of the fifth server 104e.

The processor used in the foregoing embodiments may be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for sharing data in a physical security system that comprises a plurality of server nodes, the method comprising:
    (a) accessing, using one of the server nodes ("first node"), a node identifier identifying another of the server nodes ("second node"), wherein the first and second nodes comprise at least part of a server cluster, the node identifier comprises at least part of cluster membership information identifying all and accessible by all server nodes in the server cluster, and each of the server nodes in the server cluster persistently stores its own version of the cluster membership information locally;
    (b) sending the data from the first node to the second node; and
    (c) adding a new server node to the server cluster, the adding comprising:
        (i) exchanging a version of the cluster membership information stored on the new server node with the version of the cluster membership information stored on one of the server nodes that is already part of the server cluster ("membership control node"); and
        (ii) synchronizing the version of the cluster membership information stored on the new server node with the versions of the cluster membership information stored, prior to the new server node joining the cluster, on all the server nodes in the cluster.

2. A method as claimed in claim 1 wherein the server cluster comprises at least three server nodes.

3. A method as claimed in claim 1 wherein the server nodes comprise cameras, network video recorders, and access control servers.

4. A method as claimed in claim 1 further comprising:
    (a) accessing, using the second node, a node identifier identifying the first node; and
    (b) sending additional data from the second node to the first node.

5. A method as claimed in claim 1 wherein the cluster membership information comprises:
    (a) a node identifier uniquely identifying each of the server nodes in the server cluster; and
    (b) a cluster identifier uniquely identifying the server cluster to which the server nodes belong.

6. A method as claimed in claim 5 further comprising:
    (a) rebooting one of the server nodes ("rebooted server node") in the server cluster; and
    (b) once the rebooted server node returns online, using the rebooted server node to perform a method comprising:
        (i) accessing the cluster identifier identifying the server cluster; and
        (ii) automatically rejoining the server cluster.

7. A method as claimed in claim 5 wherein sending the data comprises:
    (a) looking up, using the first node, a communication endpoint for the second node from the node identifier; and
    (b) sending the data from the first node to the communication endpoint.

8. A method as claimed in claim 7 wherein the communication endpoint and the node identifier comprise entries in a network map relating node identifiers for all the server nodes in the server cluster to corresponding communication endpoints, and wherein each of the server nodes in the server cluster persistently stores its own version of the network map locally.

9. A method as claimed in claim 8 wherein the network map permits each of the server nodes in the server cluster to send the data to any other of the server nodes in the server cluster without using a centralized server.

10. A method as claimed in claim 5 wherein the data is stored locally on the first node and further comprising modifying the data using the first node, wherein sending the data from the first node to the second node comprises part of synchronizing the data on the first and second nodes after the first node has modified the data.

11. A method as claimed in claim 10 wherein the data comprises version information generated using a causality versioning mechanism and different versions of the data are stored on the first and second nodes, and wherein synchronizing the data comprises comparing the version information stored on the first and second nodes and adopting on both of the first and second nodes the data whose version information indicates is more recent.

12. A method as claimed in claim 5 wherein the data comprises the node identifier of the first node, heartbeat state information of the first node, application state information of the first node, and version information, and wherein sending the data comprises disseminating the data to all the server nodes in the server cluster using a gossip protocol that performs data exchanges between pairs of the server nodes in the cluster.

13. A method as claimed in claim 12 wherein the data is periodically disseminated to all the server nodes in the server cluster.

14. A method as claimed in claim 12 wherein the data is sent to the second node when the first node joins the cluster.

15. A method as claimed in claim 12 wherein a domain populated with entries that can be modified by any of the server nodes in the server cluster is stored locally on each of the nodes in the server cluster, and further comprising generating the version information using a causality versioning mechanism such that the version information indicates which of the server nodes has most recently modified one of the entries.

16. A method as claimed in claim 15 wherein the application state information comprises a top-level hash generated by hashing all the entries in the domain.

17. A method as claimed in claim 16 further comprising:
(a) comparing, using the second node, the top-level hash with a top-level hash generated by hashing a version of a corresponding domain stored locally on the second node; and
(b) if the top-level hashes differ, synchronizing the domains on both the first and second nodes using the version information.

18. A method as claimed in claim 12 wherein a status entry that can only be modified by the first node is stored locally on the first node, and wherein the version information comprises a version number that the first node increments whenever it modifies the status entry.

19. A method as claimed in claim 18 wherein the application state information comprises a status entity pair comprising a status entity identifier that identifies the status entry and the version number.

20. A method as claimed in claim 19 further comprising:
(a) comparing, using the second node, the version number received from the first node with a version number of a corresponding status entry stored locally on the second node; and
(b) if the versions numbers differ, updating the status entry stored locally on the second node with the status entry stored locally on the first node.

21. A method as claimed in claim 20 wherein updating the status entry comprises sending from the first node to the second node additional status entries stored locally on the first node that were modified simultaneously with the status entry.

22. A method as claimed in claim 5 wherein the first and second nodes comprise at least part of a group of server nodes in the cluster to which the first node can send the data in a totally ordered manner to all of the server nodes in the group, and wherein sending the data comprises the first node sending the data to all of the server nodes in the group.

23. A method as claimed in claim 22 wherein the data comprises non-persistent data generated during the runtime of the physical security system.

24. A method as claimed in claim 5 wherein the data comprises streaming video streamed from another of the server nodes in the server cluster through the first node to the second node.

25. A system for sharing data in a physical security system, the system comprising a plurality of server nodes comprising a first node and a second node, wherein the first node comprises a processor communicatively coupled to a computer readable medium that has encoded thereon statements and instructions to cause the processor to perform a method comprising:
(a) accessing a node identifier identifying the second node, wherein the first and second nodes comprise at least part of a server cluster, the node identifier comprises at least part of cluster membership information identifying all and accessible by all the server nodes in the server cluster, and each of the server nodes in the server cluster persistently stores its own version of the cluster membership information locally;
(b) sending the data to the second node; and
(c) adding a new server node to the server cluster, the adding comprising:
(i) exchanging a version of the cluster membership information stored on the new server node with the version of the cluster membership information stored on one of the server nodes that is already part of the server cluster ("membership control node"); and
(ii) synchronizing the version of the cluster membership information stored on the new server node with the versions of the cluster membership information stored, prior to the new server node joining the cluster, on all the server nodes in the cluster.

26. A non-transitory computer readable medium having encoded thereon statements and instructions to cause a processor to perform a method for sharing data in a physical security system that comprises a plurality of server nodes, the method comprising:
(a) accessing, using one of the server nodes ("first node"), a node identifier identifying another of the server nodes ("second node"), wherein the first and second nodes comprise at least part of a server cluster, the node identifier comprises at least part of cluster membership information identifying all and accessible by all server nodes in the server cluster, and each of the server nodes in the server cluster persistently stores its own version of the cluster membership information locally;
(b) sending the data from the first node to the second node; and
(c) adding a new server node to the server cluster, the adding comprising:
(i) exchanging a version of the cluster membership information stored on the new server node with the version of the cluster membership information stored on one of the server nodes that is already part of the server cluster ("membership control node"); and (ii) synchronizing the version of the cluster membership information stored on the new server node with the versions of the cluster membership information stored, prior to the new server node joining the cluster, on all the server nodes in the cluster.

27. A method for sharing data in a physical security system that comprises a plurality of server nodes, the method comprising:
   (a) accessing, using one of the server nodes ("first node"), a node identifier identifying another of the server nodes ("second node"), wherein the first and second nodes comprise at least part of a server cluster and wherein the node identifier comprises at least part of cluster membership information identifying all and accessible by all server nodes in the server cluster; and
   (b) sending the data from the first node to the second node, wherein the server nodes comprise cameras, network video recorders, and access control servers, wherein the data comprises streaming video originating from one of the cameras that comprises one of the server nodes or from another camera that does not comprise one of the server nodes, and wherein the streaming video is sent from the camera from which the streaming video originates to the first node and then to the second node.

28. A method as claimed in claim 27 wherein the server cluster comprises at least three server nodes.

29. A method as claimed in claim 27 further comprising:
   (a) accessing, using the second node, a node identifier identifying the first node; and
   (b) sending additional data from the second node to the first node.

30. A method as claimed in claim 27 wherein the cluster membership information comprises:
   (a) a node identifier uniquely identifying each of the server nodes in the server cluster; and
   (b) a cluster identifier uniquely identifying the server cluster to which the server nodes belong.

31. A method as claimed in claim 30 wherein each of the server nodes in the server cluster persistently stores its own version of the cluster membership information locally.

32. A method as claimed in claim 31 further comprising:
   (a) rebooting one of the server nodes ("rebooted server node") in the server cluster; and
   (b) once the rebooted server node returns online, using the rebooted server node to perform a method comprising:
      (i) accessing the cluster identifier identifying the server cluster; and
      (ii) automatically rejoining the server cluster.

33. A method as claimed in claim 31 further comprising adding a new server node to the server cluster by performing a method comprising:
   (a) exchanging a version of the cluster membership information stored on the new server node with the version of the cluster membership information stored on one of the server nodes that is already part of the server cluster ("membership control node"); and
   (b) synchronizing the versions of the cluster membership information stored on the new server node with the versions of the cluster membership information stored on all the server nodes in the cluster prior to the new server node joining the cluster.

34. A method as claimed in claim 31 wherein sending the data comprises:
   (a) looking up, using the first node, a communication endpoint for the second node from the node identifier; and
   (b) sending the data from the first node to the communication endpoint.

35. A method as claimed in claim 34 wherein the communication endpoint and the node identifier comprise entries in a network map relating node identifiers for all the server nodes in the server cluster to corresponding communication endpoints, and wherein each of the server nodes in the server cluster persistently stores its own version of the network map locally.

36. A method as claimed in claim 35 wherein the network map permits each of the server nodes in the server cluster to send the data to any other of the server nodes in the server cluster without using a centralized server.

37. A method as claimed in claim 31 wherein the data is stored locally on the first node and further comprising modifying the data using the first node, wherein sending the data from the first node to the second node comprises part of synchronizing the data on the first and second nodes after the first node has modified the data.

38. A method as claimed in claim 37 wherein the data comprises version information generated using a causality versioning mechanism and different versions of the data are stored on the first and second nodes, and wherein synchronizing the data comprises comparing the version information stored on the first and second nodes and adopting on both of the first and second nodes the data whose version information indicates is more recent.

39. A method as claimed in claim 31 wherein the data comprises the node identifier of the first node, heartbeat state information of the first node, application state information of the first node, and version information, and wherein sending the data comprises disseminating the data to all the server nodes in the server cluster using a gossip protocol that performs data exchanges between pairs of the server nodes in the cluster.

40. A method as claimed in claim 39 wherein the data is periodically disseminated to all the server nodes in the server cluster.

41. A method as claimed in claim 39 wherein the data is sent to the second node when the first node joins the cluster.

42. A method as claimed in claim 39 wherein a domain populated with entries that can be modified by any of the server nodes in the server cluster is stored locally on each of the nodes in the server cluster, and further comprising generating the version information using a causality versioning mechanism such that the version information indicates which of the server nodes has most recently modified one of the entries.

43. A method as claimed in claim 42 wherein the application state information comprises a top-level hash generated by hashing all the entries in the domain.

44. A method as claimed in claim 43 further comprising:
   (a) comparing, using the second node, the top-level hash with a top-level hash generated by hashing a version of a corresponding domain stored locally on the second node; and
   (b) if the top-level hashes differ, synchronizing the domains on both the first and second nodes using the version information.

45. A method as claimed in claim 39 wherein a status entry that can only be modified by the first node is stored locally on the first node, and wherein the version information comprises a version number that the first node increments whenever it modifies the status entry.

46. A method as claimed in claim 45 wherein the application state information comprises a status entity pair comprising a status entity identifier that identifies the status entry and the version number.

47. A method as claimed in claim 46 further comprising:
(a) comparing, using the second node, the version number received from the first node with a version number of a corresponding status entry stored locally on the second node; and
(b) if the versions numbers differ, updating the status entry stored locally on the second node with the status entry stored locally on the first node.

48. A method as claimed in claim 47 wherein updating the status entry comprises sending from the first node to the second node additional status entries stored locally on the first node that were modified simultaneously with the status entry.

49. A method as claimed in claim 31 wherein the first and second nodes comprise at least part of a group of server nodes in the cluster to which the first node can send the data in a totally ordered manner to all of the server nodes in the group, and wherein sending the data comprises the first node sending the data to all of the server nodes in the group.

50. A method as claimed in claim 49 wherein the data comprises non-persistent data generated during the runtime of the physical security system.

51. A method as claimed in claim 31 wherein the data is streamed from another of the server nodes in the server cluster through the first node to the second node.

52. A method as claimed in claim 27 wherein the streaming video originates from the camera that does not comprise one of the server nodes ("non-node camera"), the non-node camera is directly communicative with the first node and is only indirectly communicative with the second node.

53. A system for sharing data in a physical security system, the system comprising a plurality of server nodes comprising a first node and a second node, wherein the first node comprises a processor communicatively coupled to a computer readable medium that has encoded thereon statements and instructions to cause the processor to perform a method comprising:
(a) accessing a node identifier identifying the second node, wherein the first and second nodes comprise at least part of a server cluster and wherein the node identifier comprises at least part of cluster membership information identifying all and accessible by all the server nodes in the server cluster; and
(b) sending the data to the second node,
wherein the server nodes comprise cameras, network video recorders, and access control servers,
wherein the data comprises streaming video originating from one of the cameras that comprises one of the server nodes or from another camera that does not comprise one of the server nodes, and
wherein the streaming video is sent from the camera from which the streaming video originates to the first node and then to the second node.

54. A non-transitory computer readable medium having encoded thereon statements and instructions to cause a processor to perform a method for sharing data in a physical security system that comprises a plurality of server nodes, the method comprising:
(a) accessing, using one of the server nodes ("first node"), a node identifier identifying another of the server nodes ("second node"), wherein the first and second nodes comprise at least part of a server cluster and wherein the node identifier comprises at least part of cluster membership information identifying all and accessible by all server nodes in the server cluster; and
(b) sending the data from the first node to the second node,
wherein the server nodes comprise cameras, network video recorders, and access control servers,
wherein the data comprises streaming video originating from one of the cameras that comprises one of the server nodes or from another camera that does not comprise one of the server nodes, and
wherein the streaming video is sent from the camera from which the streaming video originates to the first node and then to the second node.

* * * * *